US 12,459,849 B2

United States Patent
Leconte et al.

(10) Patent No.: US 12,459,849 B2
(45) Date of Patent: Nov. 4, 2025

(54) DEVICE AND METHOD FOR MEASURING KINEMATIC CHARACTERISTICS OF THE FREE FALL OF A GLASS PARISON IN AN APPARATUS FOR MOULDING GLASS ITEMS, AND METHOD FOR CONTROLLING SUCH AN APPARATUS

(71) Applicant: TIAMA, Saint-Genis-Laval (FR)

(72) Inventors: Marc Leconte, Loire sur Rhone (FR); Michel Ollivier, Acigne (FR)

(73) Assignee: TIAMA, Saint-Genis-Laval (FR)

( * ) Notice: Subject to any disclaimer, the term of this patent is extended or adjusted under 35 U.S.C. 154(b) by 136 days.

(21) Appl. No.: 18/267,203

(22) PCT Filed: Dec. 16, 2021

(86) PCT No.: PCT/FR2021/052359
§ 371 (c)(1),
(2) Date: Jun. 14, 2023

(87) PCT Pub. No.: WO2022/136773
PCT Pub. Date: Jun. 30, 2022

(65) Prior Publication Data
US 2024/0043305 A1 Feb. 8, 2024

(30) Foreign Application Priority Data

Dec. 24, 2020 (FR) ........................... 2014150
Apr. 16, 2021 (FR) ........................... 2103977
Apr. 16, 2021 (FR) ........................... 2107837

(51) Int. Cl.
*C03B 7/00* (2006.01)
(52) U.S. Cl.
CPC .................. *C03B 7/005* (2013.01)

(58) Field of Classification Search
CPC ...................................................... C03B 7/005
See application file for complete search history.

(56) References Cited

U.S. PATENT DOCUMENTS

| 4,205,973 A | 6/1980 | Ryan |
| 5,434,616 A | 7/1995 | Anger et al. |
| (Continued) | | |

FOREIGN PATENT DOCUMENTS

| DE | 10312550 | 7/2004 |
| EP | 0 722 078 | 7/1996 |
| (Continued) | | |

OTHER PUBLICATIONS

WO 2012035657 machine translation, Sanjoh Yoshiki, System for Forming Glass Products, Mar. 2012 (Year: 2012).*

(Continued)

*Primary Examiner* — Queenie S Dehghan
(74) *Attorney, Agent, or Firm* — Millen, White, Zelano & Branigan, P.C.; Christopher W. Brody

(57) ABSTRACT

The invention relates to a device and a method for measuring the kinematic characteristics of free fall of a glass gob with four distinct linear cameras each having an observed linear field intercepting the theoretical free fall path, respectively at a first high point of interception and at a first low point of interception, offset from each other according to the theoretical free fall path, and respectively at a second high point of interception and at a second low point of interception, offset from each other along the direction of the theoretical free fall path, the high respectively low optical axes being distinct from each other in projection on a plane perpendicular to the direction of the theoretical free fall path. The invention also comprises a method for controlling a glass article molding installation.

22 Claims, 7 Drawing Sheets

(56) References Cited

U.S. PATENT DOCUMENTS

| | | | |
|---|---|---|---|
| 2013/0000359 | A1 | 1/2013 | Matsumoto et al. |
| 2017/0121207 | A1 | 5/2017 | Tanaka et al. |
| 2018/0065878 | A1 | 3/2018 | Dalstra |

FOREIGN PATENT DOCUMENTS

| | | |
|---|---|---|
| EP | 1418158 | 5/2004 |
| EP | 2 540 679 | 1/2013 |
| JP | H08119638 A | 5/1996 |
| JP | 2004264170 A | 9/2004 |
| JP | 3623329 | 2/2005 |
| JP | 2016108182 A | 6/2016 |
| WO | 2010/047579 | 4/2010 |
| WO | 2016/181071 | 11/2016 |

OTHER PUBLICATIONS

JP 2015189593 machine translation, Kawahara et al., Apparatus for Manufacturing Glassware, Nov. 2015 (Year: 2015).*
Japanese Office Action dated Sep. 16, 2025 issued in corresponding application 2023538934.

* cited by examiner

[Fig. 1]
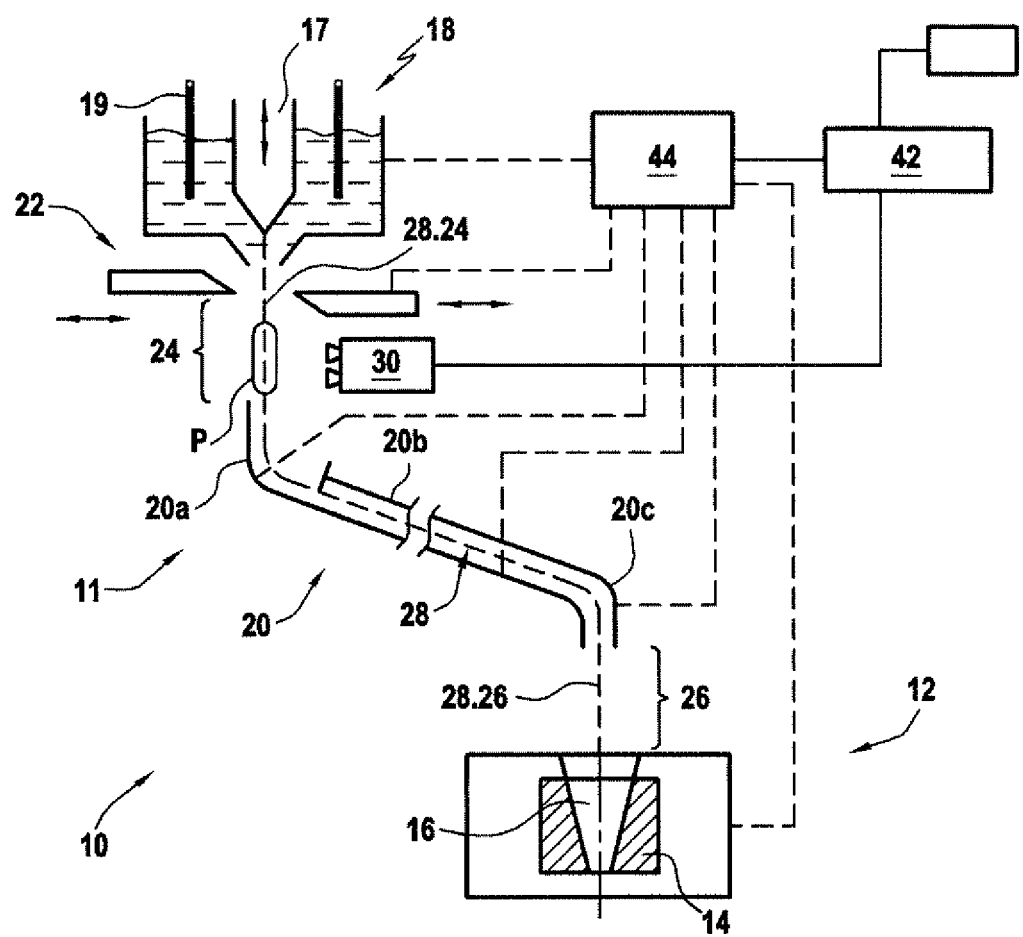

[Fig. 2]
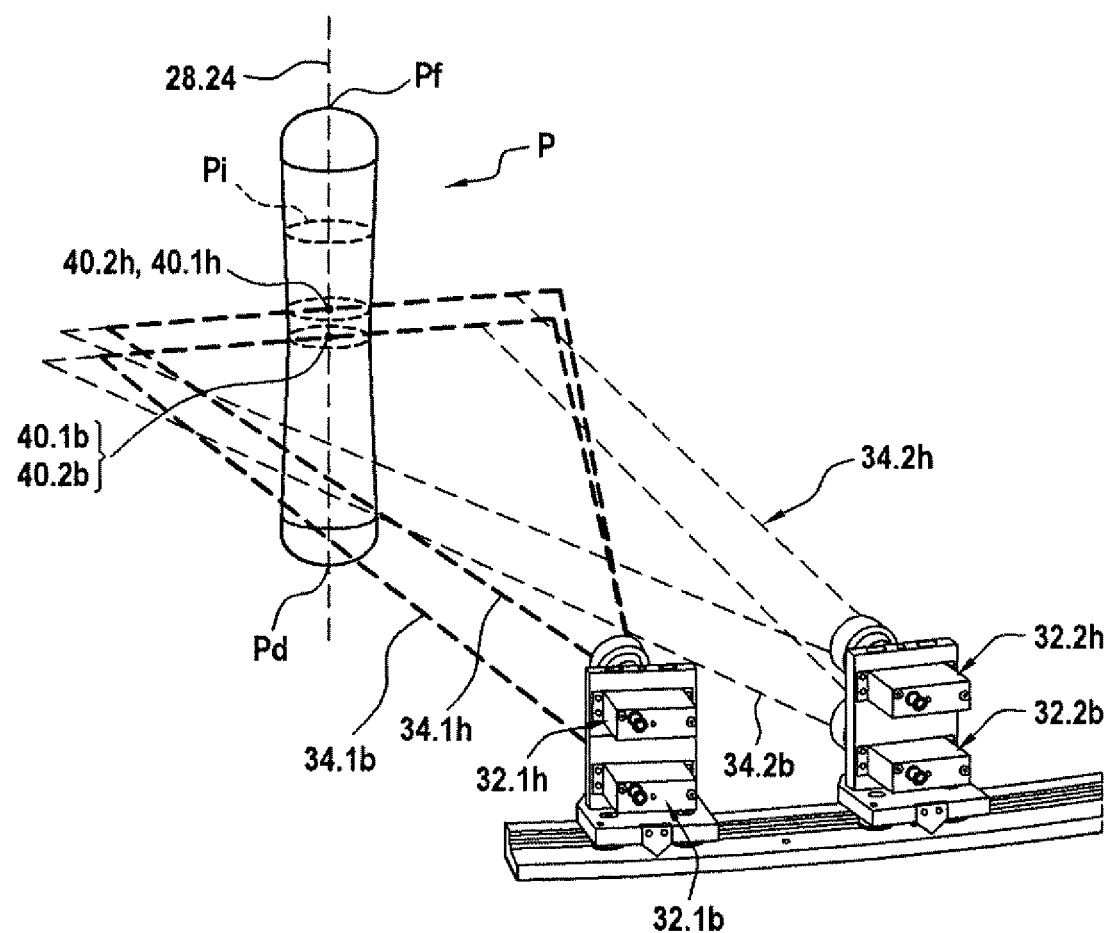

[Fig. 3]
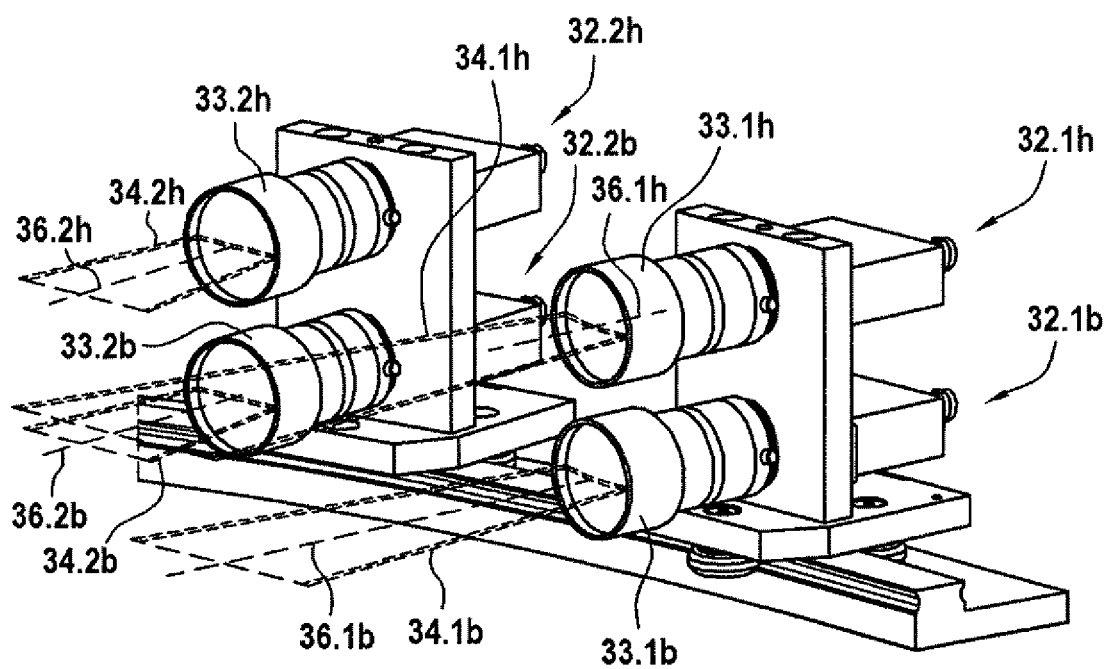

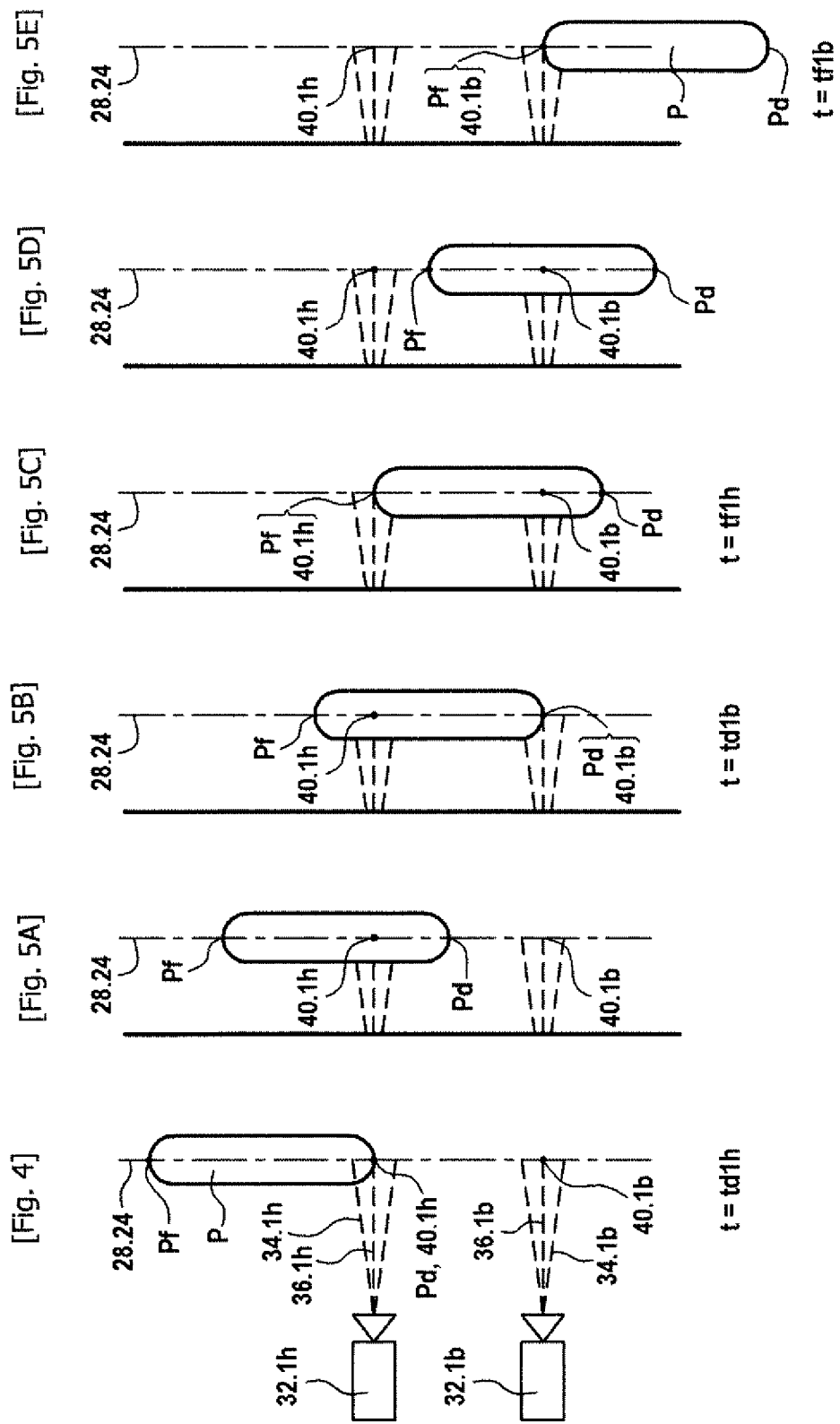

[Fig. 6]
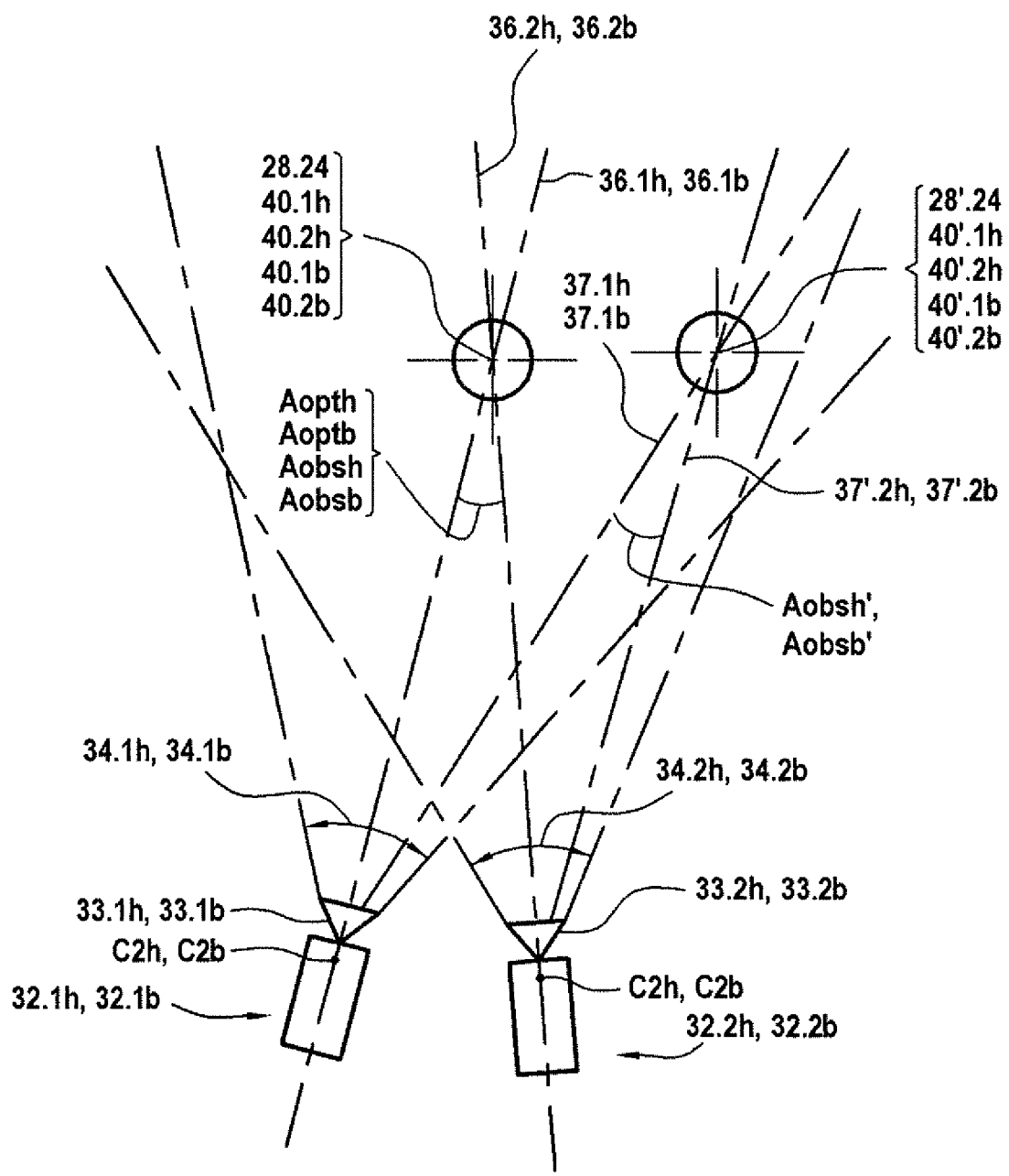

[Fig. 7]
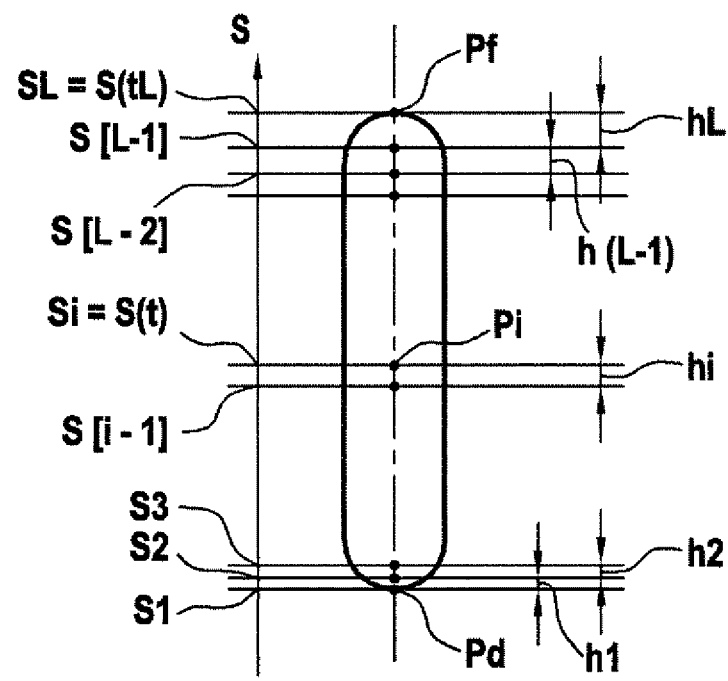

[Fig. 8]
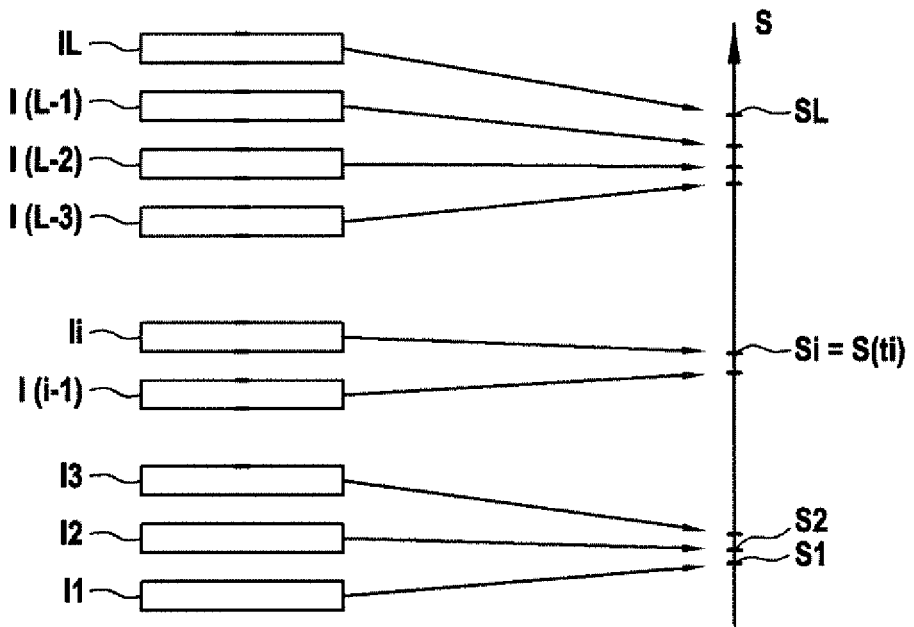
[Fig. 9]
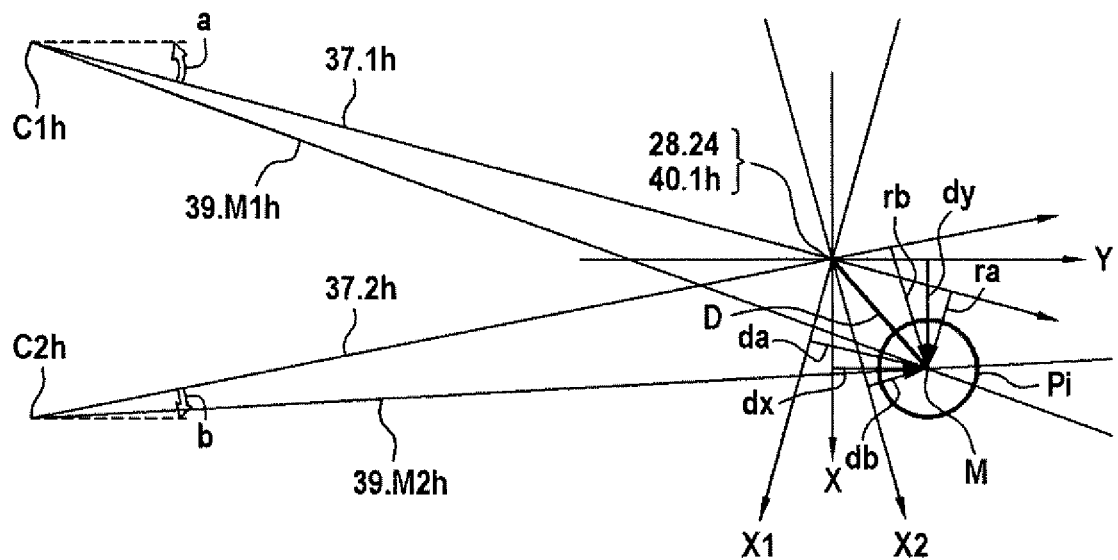

DEVICE AND METHOD FOR MEASURING KINEMATIC CHARACTERISTICS OF THE FREE FALL OF A GLASS PARISON IN AN APPARATUS FOR MOULDING GLASS ITEMS, AND METHOD FOR CONTROLLING SUCH AN APPARATUS

TECHNICAL FIELD

The invention relates to a device and a method for measuring the kinematic characteristics of the free fall of a glass gob in a glass article molding installation. The invention also relates to a method for controlling a glass article molding installation, in particular such a control method implementing at least one kinematic characteristic of the free fall of a glass gob, measured according to the measuring method according to the invention and/or with the measuring device according to the invention.

PRIOR ART

The document EP2356081/WO2010047579 describes a device and a method for measuring the kinematic characteristics of the free fall of a glass gob in a glass article molding installation which implements two cameras disposed along two axes of observation which are distinct from each other but which intersect at the same point of interception of the theoretical vertical free fall path at the inlet of the mold. These two cameras are necessarily matrix cameras such that, on several images acquired by each camera, we could have at least two complete views of the same gob at two different instants. Each view of a gob is necessarily a complete view comprised in a single acquisition cycle of the camera. It is understood that the comparison of two complete images thus acquired in one time makes it possible to determine kinematic characteristics of the free fall of a glass gob. In particular, the document teaches that it must be possible to determine a module and a direction for the speed of the gob, without however explaining how this determination is made from these images. Note that the need to acquire, in a single acquisition time, complete matrix images of the gob on the one hand imposes the use of very high performance matrix cameras, and on the other hand simply requires that the complete gob, at the point of interception, is seen in its entirety from the position of installation of each camera. However, within the framework of an industrial installation, this can be problematic due to the presence, in the installation and in its immediate surroundings, of numerous components and pieces of equipment which means that, in an industrial context, such a complete vision is not necessarily possible, in any case not necessarily for interesting axes of observation allowing accurate measurement. This is often the case for the observation of the gobs just under the shear that cuts the gobs, before the gobs enter the distributor.

The document DE10312550 describes a device and a method for measuring the geometrical characteristics of a free falling glass gob in a glass article molding installation which implements a linear camera and two photoelectric cells which are located to detect the passage of the gob at two distinct, superimposed points of interception of theoretical vertical free fall path at the inlet of the mold. The presence of a single linear camera does not make it possible to determine the kinematic characteristics. The two photoelectric cells determine the speed of the gobs only along the direction of the theoretical vertical free fall path.

The document EP1418158 describes a device including two or three CCD cameras which are disposed such that the field of vision covered by these cameras covers the spatial extent between the gob cutting shear and the funnel of the distribution system. We find the same requirement in the document US20130000359. The cameras implemented are therefore matrix cameras and, as for the document EP2356081, it should be noted that in an industrial context, such a complete vision is not necessarily possible.

In the document US2017121207, one or two cameras capture one or two images of the gob, and the one or two captured 2D image(s) of the gob are loaded into the image processor.

The document U.S. Pat. No. 4,205,973 teaches that when a gob falls, it breaks the path of two successive laser beams which make it possible to measure a speed for the beginning and the tail of a gob. Then, one (or two) linear camera(s) is/are used to perform horizontal scans in increments that represent segments of equal dimension along the vertical axis of the gob. The scan rate is monitored by a scan clock at a scan frequency that is variable over time to take into account the acceleration of the gob.

The document U.S. Pat. No. 5,434,616 refers to the previous document by noting that such an arrangement requires a meticulous synchronization of the camera scanning speed with the movement of the gob and that a slight variation in the speed of the gobs will cause an error in the measured size. Therefore, this document teaches to use two-dimensional CCD cameras to successively capture "frozen" two-dimensional images of the path of the gobs.

The document JP3623329 uses a CCD camera to capture an image of the gob. From this image, the weight of the gob is calculated. We deduce from the document that the image is a two-dimensional image. Such a device cannot determine the kinematic characteristics along two horizontal axes.

The document WO-2016181071 describes a glass article molding installation, of the type including several forming sections, a gob distributor, and including detection equipment including at least one photo-detector which is arranged to detect light information circulating along a free optical axis which intercepts at least two specific portions of gob load paths corresponding to two distinct forming sections.

The document "AMELIORATION SIGNIFICATIVE DE PERFORMANCES PAR CONTROLE AUTOMATIQUE DU GOB", INSTITUTE OF GLASS, PARIS, FR, vol. 9, no. 2, 1 Apr. 2003 (2003 Apr. 1), page 6/07, XP001160130, ISSN: 0984-7979 mentions yet another device of the prior art.

The invention aims to propose a measuring device and method that make it possible to measure the kinematic characteristics of the free fall of a glass gob in a glass article molding installation, these characteristics must be thin enough to allow a driving of the installation taking into account these measurements, for example a driving of the scissors that cut the gobs. Among the characteristics that we seek to determine are at least one of:

for at least two distinct segments of the gob, the set of first and second amounts or speeds of horizontal translation of the segment, respectively along a first horizontal axis and along a second horizontal axis, distinct from each other, between the high and low points of interception, and/or the set of first and second amounts or speeds of rotation of the gob, respectively around a first horizontal axis and around a second horizontal axis, distinct from each other, between the high and low points of interception, and/or an amount or speed of deformation of the gob between the high and low points of interception, and/or a path of at least one or more segments of the gob according to the three dimensions of space.

The measuring device and method must be able to be implemented in an industrial environment which may include many components and accessories likely to interfere with the visibility of the gob in the free fall area.

DISCLOSURE OF THE INVENTION

For the above purpose, the invention proposes a device and a method for measuring the kinematic characteristics of the free fall of a glass gob in a glass article molding installation, and a method for controlling such an installation, as defined in the claims.

The invention therefore proposes a method for measuring the kinematic characteristics of the free fall of a glass gob in a glass article molding installation, the method including, in an area of free fall of the gob along a gob load path between a glass source and a forming cavity, the gob having a theoretical vertical free fall path in the free fall area and the gob having a start end and a tail end and a gob length between the start end and the tail end:

the acquisition, using four distinct linear cameras each having a linear photoelectric sensor, a lens with an optical center and an optical axis defining for the considered camera an observed linear field, of at least four series of successive linear digital images, each image of a given series of linear images being the linear image of the observed linear field of the corresponding linear camera, the four series comprising a first high series acquired by a first high camera, a first low series acquired by a first low camera, a second high series acquired by a second high camera, and a second low series acquired by a second low camera, the four series of linear images corresponding to linear images respectively of a first high linear field, of a first low linear field, of a second high linear field and of a second low linear field such that:

the first high linear field and the first low linear field each extend along a respective plane defined by the corresponding optical axis and a horizontal extension direction perpendicular to the corresponding optical axis, the first high linear field and the first low linear field each intercepting the theoretical free fall path, respectively at a first high point of interception and at a first low point of interception, the first high and low points of interception being offset from each other according to the theoretical free fall path of a vertical offset;

the second high linear field and the second low linear field each extend along a respective plane defined by the corresponding optical axis and a horizontal extension direction perpendicular to the corresponding optical axis, the second high linear field and the second low linear field each intercepting the theoretical free fall path, respectively at a second high point of interception and at a second low point of interception, the second high and low points of interception being offset from each other along the direction of the theoretical free fall path;

the images of the four series of linear images each comprising an image of the corresponding point of interception, acquired respectively along a first high axis of observation, a first low axis of observation, a second high axis of observation and a second low axis of observation, the axis of observation of each point of interception by the corresponding linear camera being contained in the linear field of the corresponding linear camera, passing through the optical center of the lens of the camera, and through the corresponding point of interception of the theoretical free fall path;

the first and second high axes of observation form together, in projection on a plane perpendicular to the direction of the theoretical free fall path, a high deviation angle of observation different from 0 angle degree and different from 180 angle degrees around the theoretical free fall path;

the first and second low axes of observation form together, in projection on a plane perpendicular to the direction of the theoretical free fall path, a low deviation angle of observation different from 0 angle degree and different from 180 angle degrees around the theoretical free fall path;

the time deviation between the acquisition of any two images of the same series and between any two images of two distinct series is determinable; the method including the computer identification of a high linear image and a low linear image each comprising an image of the same given end of the gob among the start end and the tail end of the gob and the computer deduction of a time deviation between the acquisition of the high linear image and the acquisition of the low linear image and, from said identification:

the computer calculation of an instantaneous speed of vertical translation of said given end of the gob upon passage of the given end of said gob at one among the high and low points of interception, from the time deviation between the acquisition of the high linear image and the acquisition of the low linear image, and by application of the law of kinematics of the free falling bodies;

and computationally, the matching, for the intermediate linear images comprising the image of a segment of the gob other than its two start and tail ends, of the image of the gob contained in the intermediate linear image with a corresponding segment of the gob, by application of the law of kinematics of the free falling bodies as a function of said instantaneous speed of vertical translation of the given end of said gob upon passage of the given end of the gob at the point of interception corresponding to said instantaneous speed of vertical translation of the given end of said gob, and of the time elapsed between the acquisition of said considered intermediate linear image and said passage of said end of the gob at the point of interception corresponding to said instantaneous speed of vertical translation of the given end of said gob;

and the method including the computer determination of at least one among:

for at least two distinct segments of the gob, the set of first and second amounts of horizontal translation of the segment, or the set of first and second average speeds of horizontal translation of the segment, respectively along a first horizontal measurement axis and along a second horizontal measurement axis, distinct from each other, between the high and low points of interception, and/or the set of first and second amounts of rotation of the gob, or the set of first and a second average speeds of rotation of the gob, respectively around a first horizontal axis and around a second horizontal axis, distinct from each other, between the high and low points of interception, and/or an amount of deformation of the gob, or an average speed of deformation of the gob, between the high and low points of interception, and/or a path of at least one or more segments of the gob according to the three dimensions of space.

Such a method according to the invention can further comprise one or more of the following optional characteristics, taken alone or in combination.

In some cases, the method comprises the computer determination of a positional deviation between two considered segments of the gob whose respective images are contained in two consecutive linear images of a given series of linear images, as a function of:

the number of linear images in the series determined between, on the one hand, one of the consecutive linear images comprising one of the two considered segments, and on the other hand, one among a start linear image and a tail linear image of the determined series, comprising respectively an image of the start end and the tail end of the gob;

the instantaneous speed of vertical translation of a given end of the gob upon passage of the given end of said gob at the point of interception corresponding to the determined series;

a frequency of acquisition of the linear images for the determined series; and the gravitational constant.

In some cases, the method comprises the computer calculation of first and second instantaneous speeds of vertical translation of said given end of the gob during the passage of the given end of said gob at one among the high and low points of interception, respectively based on the first high series and the first low series of linear images, and based on the second high series and the second low series of linear images, and in that we computationally determine an instantaneous speed of vertical translation of said given end of the gob during the passage of the given end of said gob at this point of interception as the average of said first and second instantaneous speeds of vertical translation of said given end of the gob during the passage of the given end of said gob at this point of interception.

In some cases, the method comprises the computer calculation of the gob height between the start end and the tail end by summing the positional deviations for all the successive linear images of a determined series ranging from the start linear image to the tail linear image of the determined series.

In some cases, the method comprises the computer determination, for a collection of several segments of a given gob:

in the first high series and in the first low series of a first high linear image and of a first low linear image corresponding to each segment to determine the first amount of horizontal translation, along the first horizontal measurement axis, of each segment of the collection between the high linear image and the low linear image between the first high and low points of interception;

in the second high series and in the second low series of a second high linear image and of a second low linear image corresponding to each segment to determine the second amount of horizontal translation, along the second horizontal measurement axis, of each segment between the first high and low points of interception;

and the method comprises the step of computationally deducing amounts of horizontal translation of each section of the collection:

two horizontal components of average speed of horizontal translation of the gob between the high and low points of interception, respectively along two distinct horizontal axes; and/or two angles of rotation of the gob between the high and low points of interception around two horizontal axes; and/or a deformation of the gob during its fall between the high and low points of interception.

In some cases, the method comprises the computer measurement of at least one geometric dimension of the gob among:

a first diameter of the gob along a first horizontal direction, a second diameter along a second horizontal direction distinct from the first horizontal direction, a length or a height of the gob, a volume of the gob.

In some cases, the computer determination of an amount of horizontal translation of a segment between a high point of interception and the corresponding low point of interception, comprises the detection of the position of at least the same point of the segment in the high linear image and in the low linear image of the corresponding high series and low series. In some variants of such a case, the same point is one among an edge point of the segment, a midpoint between two edge points of the segment, or a point whose image is recognizable in the high and low linear images.

In some cases, the first high axis of observation and the first low axis of observation are superimposed along the vertical direction in the same vertical plane.

In some cases, the first high axis of observation and the first low axis of observation are parallel to each other.

In some cases, the first high axis of observation and the first low axis of observation are perpendicular to the theoretical free fall path.

In some cases, the first high axis of observation and the second high axis of observation intercept the same high point of interception of the theoretical vertical free fail path, and/or the first low axis of observation and the second low axis of observation intercept the same low point of interception of the theoretical vertical free fall path.

The invention also relates to a device for measuring the kinematic characteristics of the free fall of a glass gob in a glass article molding installation, of the type including, in a area of free fall of the gob along a gob load path between a glass source and a forming cavity, the gob having a theoretical vertical free fall path in the free fall area and the gob having a start end and a tail end and a gob length between the start end and the tail end:

at least four distinct linear cameras each having a lens with an optical center and an optical axis defining for the considered camera an observed linear field, comprising a first high camera, a first low camera, a second high camera and a second low camera each having respectively a first high optical axis, a first low optical axis, a second high optical axis and a second low optical axis, distinct from each other, said cameras each being able to form digital images of an observed linear field, respectively first high linear field, first low linear field, second high linear field and second low linear field, wherein:

the first high linear field and the first low linear field each extend along a respective plane defined by the corresponding optical axis and a horizontal extension direction perpendicular to the corresponding optical axis, the first high linear field and the first low linear field each intercepting the theoretical free fall path, respectively at a first high point of interception and at a first low point of interception, the first high and low points of interception being offset from each other according to the theoretical free fall path;

the second high linear field and the second low linear field each extend along a respective plane defined by a corresponding optical axis and a horizontal extension direction perpendicular to the corresponding optical axis, the second high linear field and the second low linear field each intercepting the theoretical free fall path, respectively at a second high point of interception and at a second low point of interception, the second high and low points of interception being offset from each other along the direction of the theoretical free fall path;

the high optical axes are distinct from each other in perpendicular projection on a plane perpendicular to the direction of the theoretical free fall path, and the low optical axes are distinct from each other in perpendicular projection on a plane perpendicular to the direction of the theoretical free fall path.

In some cases, the device includes an electronic calculation unit programmed to implement a method having any one of the method characteristics mentioned above.

In some cases:

the high optical axes form together, in perpendicular projection on a plane perpendicular to the direction of the theoretical free fall path, a deviation angle of high optical axis different from 0 angle degree and different from 180 angle degrees around an axis parallel to the theoretical free fall path passing through the point of convergence of the projections of the two optical axes in the projection plane;

the low optical axes form together, in perpendicular projection on a plane perpendicular to the direction of the theoretical free fall path, an acute deviation angle of low optical axis different from 0 angle degree and different from 180 angle degrees around an axis parallel to the theoretical free fall path passing through the point of convergence of the projections of the two optical axes in the projection plane.

In some cases, the first high linear field and the first low linear field as well as the second high linear field and the second low linear field each intercept the theoretical free fall paths of several glass gobs formed at the same time by the same source of glass.

The invention also relates to a method for controlling a glass article molding installation, the installation including a source of glass, at least one shear which is arranged at the outlet of the glass source and which is actuated at regular intervals to cut successive gobs which fall by gravity into a distributor that leads the gobs along at least one gob load path towards a forming cavity of the installation, and the gob load path comprising at least one area of free fall of the gob between the shear and the distributor, characterized in that the control method includes a measurement of the kinematic characteristics of the free fall of the glass gobs in the area of free fall of the gob between the shear and the distributor, said measurement comprising the determination, for a collection of several segments of a given gob, of amounts of horizontal translation of each section of the collection, and in that the control method includes an adjustment of at least one operating parameter of the shear as a function of at least the amounts of horizontal translation of each section of the collection.

Such a control method according to the invention can further comprise one or more of the following optional characteristics, taken alone or in combination.

In some cases, the adjustment comprises the adjustment of the position of a cutting point of the shear.

In some cases, the adjustment comprises the adjustment of a speed of displacement of at least the blade of the shear.

In some cases, the adjustment comprises the adjustment of a profile of speed of displacement of at least one blade of the shear.

In some cases, the adjustment comprises the adjustment of a lubrication parameter of the shear.

In some cases, said measurement comprises the determination of at least two horizontal components of speed of horizontal translation of at least one segment of the gob between high and low points of interception.

In some cases, said measurement comprises the determination of at least a first component of rotation of the gob around a first horizontal axis, and in that the adjustment comprises the adjustment of a component of the position of a cutting point of the shear, and/or the adjustment of a component of the speed of displacement of at least the blade of the shear, and/or the adjustment of a profile of a component of speed of displacement of at least one blade of the shear.

In some cases, said measurement comprises the determination of at least a second component of rotation of the gob around a second horizontal axis distinct from the first horizontal axis, and the control method includes an adjustment of at least one operating parameter of the shear as a function of the first component of rotation of the gob around the first horizontal axis and of the second component of rotation of the gob around the second horizontal axis.

In some cases, said measurement of the kinematic characteristics of the free fall of the glass gobs implements a determination method having any one of the determination method characteristics mentioned above.

BRIEF DESCRIPTION OF THE DRAWINGS

FIG. 1 is a schematic view of a glass article molding installation.

FIG. 2 is a schematic perspective view of a measuring device according to the invention.

FIG. 3 is a schematic perspective view of the linear cameras of a measuring device according to the invention.

FIG. 4 and FIGS. 5A-5E are schematic views illustrating different instants of acquisition of the images of a high series and of a low series of linear images in a method according to the invention.

FIG. 6 is a schematic plan view illustrating a relative layout of the two linear cameras of the same high or low group of a measuring device according to the invention.

FIG. 7 is a diagram illustrating the vertical coordinates, on a gob, associated with the successive images of a series of linear images acquired by a linear camera within the framework of the invention.

FIG. 8 is a diagram illustrating the matching, for the intermediate linear images comprising the image of a segment of the gob other than its two start and tail ends of the image of the gob contained in the intermediate linear image with a corresponding segment of the gob.

FIG. 9 is a diagram illustrating the possibility of carrying out the determination by stereovision of the position in the plane determined by the optical axes of two cameras belonging to the same group of cameras.

DESCRIPTION OF THE EMBODIMENTS

FIG. 1 partially and schematically illustrates an exemplary embodiment of a glass article molding installation 10. The installation 10 includes in particular a forming machine 11 comprising a forming section 12, or several distinct forming sections 12, each including at least one mold 14 having at least one mold cavity 16. The installation 10 can include a source 18 of malleable glass, therefore of hot glass, and a distributor 20 of glass gobs P which distributes, by gravity, gobs P of malleable glass to each mold cavity 16 of the forming machine 11. In known manner, the installation can include at least one shear 22 which is arranged at the outlet of the source of hot glass 18 and which is actuated at regular intervals to cut an extruded part of malleable glass from the source 18 or for installations including several mold cavities per section, possibly several parts in parallel simultaneously. The shear 22 generally includes two blades. The blades of the shear are actuated according to a relative movement of translation for a cutout called parallel cutout or of rotation for a cutout called scissor cutout, preferably with the two movable blades. In some installations, there could be several shears 22, for example when the sections contain several blank molds and are loaded with several gobs simultaneously at each cycle.

In the present document, an extruded part of malleable glass as chopped up by the shear 22 is called gob P. Such a gob is sometimes called drop. The gob P is, called gob at this stage of a forming method. The malleable glass, at the level of the cut-out by the shear 22, generally has a temperature greater than 900° C., for example comprised between 1,100 and 1,300° C. This gob is generally considered to be a solid cylinder of malleable glass having a length for which we can define a central axis corresponding to the length of the gob. In the present text, it is understood that the gob P is in reality not a perfect cylinder. Thus, the outer lateral surface of the gob P may have deformations relative to a cylinder. Similarly, the high Pf and low Pd ends of the gobs, which result from the shearing operation by the shear 22, generally do not have a planar section perpendicular to the central axis. However, it will be understood that the gob generally remains a substantially cylindrical-shaped object elongated along a central axis. This central axis can be rectilinear, at least in theory. In practice, in particular when the gob is caused to deform along its path in the distributor 20, this central axis is caused to deform. Also, in the present text, the curvilinear dimension of the central axis will be called length of the gob P. The projection of this length on a vertical axis Z relative to the orientation of the Earth's gravity will be called height of the gob P.

The time interval between two actuations of the shear 22 determines the length of the gob, and its weight and its volume since the section of the gobs and the glass flow rate are determined, in particular as a function of the operating parameters of the source 18 and the shear 22. The source 18 of malleable glass is arranged above the forming machine 11, therefore above the molds 14 of the forming sections 12 to allow the distribution of the gobs by gravity. The distributor 20 generally extends along several branches between the source 18 of hot glass and the mold cavities of each of the forming sections. FIG. 1 represents only one of these branches. The source 18, the distributor 20 and the shear 22 can be of any known type and are not described in more detail.

Machines for forming hollow glass articles implement different methods combining steps of filling a mold, then of successive pressing and/or blowing. For the clarity of the description, the example is taken from the forming of bottles according to the known methods called press-and-blow or blow-and-blow methods.

In the bottle forming machines, each forming section 12 can include several molds, for example two molds, one of which is a blank mold and the other is a blow mold. Each section could include a set of blank molds and a set of finishing molds, a set of molds being composed of several molds of the same forming section, relating to the same forming step, and generally opening and closing at the same time. It is understood in this case that a given gob is guided by the distributor 20 towards a blank mold, for example a blank mold of the forming section where the gob undergoes a first forming operation, called drilling operation, carried out by compressed air blowing or by penetration of a punch. A transfer system (not represented) is then capable of taking off the gob that has undergone the first forming operation, namely the blank, from the blank mold to take it to a secondary mold generally referred to as a blow mold where the blank can undergo at least a second forming operation, the last operation called finishing operation. Generally, each mold of a forming section includes two half-molds that are movable relative to each other along a direction perpendicular to a parting plane by which the two half-molds are in contact in a closed position. FIG. 1 illustrates only one mold 14 per forming section 12, but the invention will naturally find application in installations called multi-gob installations including several molds per forming section.

A section 12 can include a single mold cavity 16. However, as mentioned above, in particular in the multi-gob installations, each of the different forming sections 12 can include at least two distinct forming cavities 16, generally because they include several molds, more rarely because they include a mold with several cavities.

Generally, the source 18 of hot glass, via the shear 22, simultaneously delivers as many gobs as there are forming cavities in a forming section. It is therefore understood that the forming sections are supplied with gobs successively one after the other. We can therefore have two forming sections which are supplied one after the other through the same outlet of the source 18 of hot glass. These two sections are therefore not supplied at the same time.

The distributor 20 therefore collects the gobs cut by the shear 22 and each leads them towards a forming cavity of a forming section along a load path 28 corresponding to a forming cavity 16. The load paths for the different forming cavities include common portions and specific portions. A specific portion is a portion of the load path corresponding to a forming cavity which is followed only by the gobs that are directed by the distributor towards this forming cavity. The distributor 20 therefore includes means for guiding and diverting the gobs. These guiding and diverting means can include scoops, throughs, deflectors, etc., some of which at least can be movable to form a diverter. In the distributor, the throughs, the deflectors and diverters determine the gob load path.

In the example of FIG. 1, the means for guiding and diverting the distributor 20 indeed include, successively along the load path between the source 18 and the mold 14, a scoop 20a, a through 20b and a deflector 20c. Generally, the scoop 20a is adjustable in position and in orientation. In particular, in the case of a machine including several sections, the scoop 20a can be rotatable around a vertical axis to collect the gobs coming from the source and direct them towards one of several throughs corresponding to several forming sections. After the scoop 20a, the gob P is supported by a through 20b, then a deflector 20c deflects the gob to orient it in the direction of the cavity 16 corresponding to this deflector 20c. In some installations, it can be provided at the inlet of the scoop, therefore at the end of the free fall, a funnel and/or a gob accelerator. For example, the gob accelerator uses a pneumatic action to enter the gobs with an increased speed. This action may be different depending on the section and/or the cavity for which each gob is intended.

In the example illustrated, the initial portion of the gob load path, which is a specific portion of the load path, is a high free fall area 24 along which the gob is not guided, and falls without vertical guidance under the effect of Earth's gravity, between the shear 22 and the scoop 20a of the distributor 20.

In the example illustrated, the terminal portion of the gob load path, which is a specific portion of the load path, is a low free fall area 26 along which the gob is not guided, and falls without vertical guidance under the effect of gravity at the outlet of the deflector 20c of the distributor 20 in the mold cavity 16.

Just like the scoop 20a, the different elements of the distributor such as the through(s) 20b and the deflector(s) 20c are adjustable in position and in orientation so that the gob is guided accurately towards the mold cavity 16. It is important to note that the setting of the deflector 20c contributes to determining the end of the load path, particularly the position of the path with respect to the axis of opening of the cavity.

In the bottle forming machines, the control and the synchronization of the operations of forming the gobs, the operation of shearing the shear 22, the movement of the molds, the movement of the punch(es) of the hot glass source 18, the blowing, the transfer etc. were formerly performed mechanically, by means of a grooved drum with screw studs, each stud, which is adjustable, having an action of mechanical control of valves controlling cylinders. The new machines are now equipped with an electronic control, that is to say by means of a programmable logic controller, which makes it possible to drive movements with actuators of any type, such as those operating with pneumatic or electric energy. As will be detailed later, the electronic control is able to exchange with any inner or outer member, including sensors or actuators, synchronization signals, control signals or information on the status of the installation coming from sensors, for example by a communication network of wired, wireless or mixed type. However, a programmable logic controller is still a system with a very particular programming and limited to cyclic sequential programs. An electronic control can for example implement cyclic sequential programs, but can also integrate internal model controls, multi-variable regulation algorithms, simulations, optimizations.

According to one aspect of the invention, the installation 10 includes at least one device 30 for measuring the kinematic characteristics of the free fall of a glass gob P, in the glass article molding installation. This measuring device 30 is a linear camera-based optical device, and it is therefore arranged in the installation to be able to observe the gobs P in an area of free fall of the gob along a gob load path between a glass source 18 and a forming cavity 16. It is seen above that, in the example, the installation has, along the path of a gob P, a high free fall area 24 and a low free fall area 26. The installation could be equipped with a first measuring device for the high free fall area 24 and/or with a second device for the low free fall area 26. The following will describe in detail the case of an installation including such a device 30 for measuring the kinematic characteristics, arranged in the installation to be able to observe the gobs P in the high free fall area 24.

In the free fall area, in particular the high free fall area 24, the gob P is only subjected to the action of Earth's gravity and, at least in the high free fall area 24, the gob P is considered to have a theoretical free fall path 28.24 which is vertical in the free fall area. In addition, in this high free fall area, the gob P is considered to have, during this vertical fall, a theoretical vertical orientation, its central axis being assumed to be vertical and coinciding with the theoretical free fall path 28.24 which is vertical. Therefore, in this theoretical vertical orientation during free fall, the gob P is considered to have a start end Pd, or lower end or low end, and a tail end Pf, or upper end or high end along the vertical direction, and a gob length between the start end Pd and the tail end Pf. It will of course be seen that this theoretical orientation is effectively theoretical and that the measuring device 30 will allow knowing the deviation between the actual orientation of the gob and this theoretical orientation.

As can be seen more particularly in FIGS. 2 and 3, the measuring device 30 includes at least four distinct linear cameras 32.1h, 32.1b, 32.2h, 32.2b (which can be collectively and/or indistinctly designated by the common reference 32), each having a lens 33.1h, 33.1b, 33.2h, 33.2b (which can be collectively and/or indistinctly designated by the common reference 33) with an optical center (see FIG. 6 C1h, C1b, C2h, C2b) and an optical axis 36.1h, 36.1b, 36.2h, 36.2b (which can be collectively and/or indistinctly designated by the common reference 36) defining, for the considered camera, an observed linear field 34.1h, 34.1b, 34.2h, 34.2b (which can be collectively and/or indistinctly designated by the common reference 34.) These four linear cameras therefore comprise a first high camera 32.1h, a first low camera 32.1b, a second high camera 32.2h and a second low camera 32.2b each having respectively a first high optical axis 36.1h, a first low optical axis 36.1b, a second high optical axis 36.2h and a second low optical axis 36.2b, distinct from each other. The notions of "high" and "low" refer to the orientation along the vertical direction of the Earth's gravity.

Each linear camera 32 includes a linear photoelectric sensor, therefore formed of a line of photoelectric elements on which the lens 33 of the linear camera 32 forms a photographic image of the linear field 34 seen by the sensor through the lens 33. The sensor delivers an image signal which is successively acquired to give temporally successive photographic, digital and linear images. The sensor can be a sensitive sensor in the visible light range, which makes it possible to use sensors and lenses that are widely available on the market, having adequate performance at a reasonable cost. However, this does not exclude the use of a sensor that would be as sensitive in the infrared domain, or even sensitive exclusively in the infrared domain. For each of the linear cameras 32, the lens 33 of the camera 32 determines the optical axis 36 of the camera. The lens 33 of the camera 32 can be a telecentric lens, or a conventional lens.

Each of said linear cameras 32 is therefore able to form digital images of the linear field 34 corresponding to this camera, so that the 4 cameras define a total of 4 linear fields 34, respectively a first high linear field 34.1h, a first low linear field 34.1b, a second high linear field 34.2h and a second low linear field 34.2b. The linear field 34 corresponding to a camera extends along the direction of a plane defined by the optical axis 36 of the linear camera 32 and along an extension direction perpendicular to the optical axis and corresponding to the line of photoelectric elements forming the linear photoelectric sensor.

Thus, the first high linear field 34.1$h$ and the first low linear field 34.1$b$ each extend along a respective plane defined by the corresponding optical axis 36.1$h$, 36.1$b$ and along a horizontal extension direction perpendicular to the corresponding optical axis 36.1$h$, 36.1$h$ of the linear camera 32 associated with this linear field 34.

The first high linear field 34.1$h$ and the first low linear field 34.1$b$ each intercept the theoretical free fall path 28.24 at a first high point of interception 40.1$h$, respectively at a first low point of interception 40.1$b$, the first high and low points of interception being offset from each other according to the theoretical free fall path 28.24 by a vertical offset, This vertical offset between the first high point of interception 40.1$h$ and the first low point of interception 40.1$b$ may be advantageously strictly less than an expected nominal length of the gob to allow implementing the method which will be described later even in the cases where the environment does not allow easy vision of the gob.

The second high linear field 34.2$h$ and the second low linear field 34.2$b$ each extend along a respective plane defined by the corresponding optical axis 36.2$h$, 36.2$b$ and a horizontal extension direction perpendicular to the corresponding optical axis of the linear camera 32 associated with this linear field 34. The second high linear field 34.2$h$ and the second low linear field 34.2$b$ each intercept the theoretical free fall path at a second high point of interception 40.2$h$, respectively at a second low point of interception 40.2$b$, the second high and low points of interception being offset from each other by a vertical offset along the direction of the theoretical free fall path. This vertical offset between the second high and low points of interception can also advantageously be strictly less than an expected nominal length of the gob, with the same advantage as above.

As can be seen in the figures, the high optical axes, namely the first high optical axis 36.1$h$ and the second high optical axis 36.2$h$, are distinct from each other in perpendicular projection on a plane perpendicular to the direction of the theoretical free fall path so as to allow a stereographic vision of the free fall area. In other words, the first high optical axis 36.1$h$ and the second high optical axis 36.2$h$ are not superimposed vertically one above the other and are not coincident. Thus, the two high cameras 32.1$h$ and 32.2$h$ are neither coincident, nor directly 180° opposite, nor directly superimposed vertically parallel one above the other, this in order to obtain a stereographic vision of the free fall area.

As can be seen in the figures, the low optical axes, namely the first low optical axis 36.1$b$ and the second low optical axis 36.2$b$, are distinct from each other in perpendicular projection on a plane perpendicular to the direction of the theoretical free fall path so as to allow a stereographic vision of the free fall area. In other words, the first low optical axis 36.1$b$ and the second low optical axis 36.2$b$ are not superimposed vertically one above the other and are not coincident. Thus, the two low cameras 32.1$b$ and 32.1$b$ are neither coincident, nor directly 180° opposite, nor directly superimposed vertically parallel one above the other, this in order to obtain a stereographic vision of the free fall area.

As can be seen in FIG. 6, we will preferably make sure that the high optical axes, namely the first high optical axis 36.1$h$ and the second high optical axis 36.2$h$, form together, in perpendicular projection on a plane perpendicular to the direction of the theoretical free fall path 28.24, a deviation angle of high optical axis Aopth, around the theoretical free fall path 28.24, or in any case around an axis parallel thereto passing through the point of convergence of the projections of the two optical axes in the projection plane, which is different from 0 angle degree and different from 180 angle degrees, this in order to make it possible to have a large area of intersection of the linear fields within which it will be possible to have the same gob from two different points of view, which makes it possible, for any point of this intersection area, to determine geometric and positional characteristics of the gob along two horizontal directions by stereovision effect.

FIG. 6 is a vertical projection. In the example illustrated in FIGS. 2, 3 and 6, the low linear cameras 32.1$b$, 32.2$b$ are identical and disposed in the same way as the high linear cameras 32.1$h$, 32.2$h$, so that in FIG. 6, all their elements are represented as being superimposed on the corresponding elements of the high linear cameras 32.1$h$, 32.2$h$. The low optical axes, namely the first low optical axis 36.1$b$ and the second low optical axis 36.2$b$, form together, in perpendicular projection on a plane perpendicular to the direction of the theoretical free fall path 28.24, a deviation angle of low optical axis Aoptb, around the theoretical free fall path, or in any case around an axis parallel thereto passing through the point of convergence of the projections of the two optical axes in the projection plane, which is different from 0 angle degree and different from 180 angle degrees, this in order to make it possible to determine geometric and positional characteristics of the gob along two directions by stereovision effect.

Preferably, as illustrated in the figures, the first high optical axis 36.1$h$ and the second high optical axis 36.2$h$, or at least their perpendicular projection on a plane perpendicular to the direction of the theoretical free fall path 28.24, are convergent at a point of convergence located in front of the high linear cameras 32.1$h$, 32.2$h$, that is to say on the opposite side of the sensor of the cameras relative to their lens. Similarly, preferably, the first low optical axis 36.1$b$ and the second low optical axis 36.2$b$, or at least their perpendicular projection on a plane perpendicular to the direction of the theoretical free fall path 28.24, are convergent in front of the low linear cameras 32.1$b$, 32.2$b$, as illustrated in the figures. Parallel or divergent high optical axes, and/or parallel or divergent low optical axes are possible, but not optimal.

As can be seen in FIG. 4, during the free fall, a given gob P therefore first passes in the first high linear field 34.1$h$ of the first high camera 32.1$h$ before passing in the first low linear field 34.1$b$ of the first low camera 32.1$b$. At the same time, the same gob first passes through the second high linear field 34.2$h$ of the second high camera 32.2$h$ before passing in the second low linear field 32.2$b$ of the second low camera 32.2$b$. In front of a given linear camera 32, the start end Pd of a given gob P passes in front of the given camera before the tail end Pf of the same gob P passes in front of the given camera.

In the example illustrated, the first high optical axis 36.1$h$ of the first high camera 32.1$h$ and the first low optical axis 36.1$b$ of the first low camera 32.1$b$ are superimposed along the vertical direction in the same vertical plane. In the example illustrated, the second high optical axis 36.2$h$ of the second high camera 32.2$h$ and the second low optical axis 36.2$b$ of the second low camera 32.2$b$ are superimposed along the vertical direction in the same vertical plane.

In the illustrated example, the deviation angle of low optical axis Aoptb, between the low optical axes 36.1$b$, 36.2$b$ is identical to the deviation angle of high optical axis Aopth between the high optical axes 36.1 *h*, 36.2*h*. This layout, which is in no way mandatory, facilitates the calculations which will be described below.

In some embodiments, the plane defined by the first high optical axis 36.1*h* and the first low optical axis 36.1*b* is a plane which also contains the theoretical vertical path 28.24 of the gob in the considered free fall area. This layout can in particular be used when the measuring device 30 is implemented for a single given theoretical free fall path of the gob.

Furthermore, FIG. 6 schematically illustrates a case where the same measuring device 30, comprising the four linear cameras 32 as described above (only the first high camera 32.1*h* and the second high camera 32.2*h* is visible in FIG. 6, but the same diagram can be duplicated to represent the situation of the first low camera 32.1*b* and of the second high camera 32.2*b*), makes it possible to observe at least two theoretical vertical free fall paths 28.24 and 28'.24, in the same free fall area 24, for at least two gobs from the same source of glass 18 in the direction of at least two distinct forming cavities. At least in the considered free fall area 24, the two theoretical vertical free fall paths 28.24 and 28'.24 are parallel and are offset from each other along a horizontal direction perpendicular to their common vertical direction. FIG. 6 represents the particular case in which the optical axes 36 of the four linear cameras 32 are positioned to intercept a first 28.24 of the two theoretical free fall paths, in the sense that the optical axes 36.1*h*, 36.2*h*, . . . intersect this path 28.24 each at a respectively high and low point of interception. On the other hand, since the two theoretical vertical free fall paths 28.24 and 28'.24 are offset horizontally relative to each other, it is seen that the optical axes 36.1*h*, 36.2*h*, . . . of the four cameras 32.1*h*, 32.2 *h*, . . . cannot intersect the second theoretical vertical free fall path 28'24. Nevertheless, the four linear fields 34.1*h*, 34.2*h*, corresponding to the four linear cameras 32.1*h*, 32.2*h*, . . . of this same measuring device 30 also intercept, without modification of the orientation of the four linear cameras 32.1*h*, 32.2*h*, . . . relative to the installation, this second theoretical vertical free fall path 28'.24, at high and low points of interception 40'.1*h*, 40'.1*b*, 40'.2*h*, 40'.2*b* corresponding to each of the four linear fields 34.1*h*, 34.2*h*, . . . . Thus, in general, the measuring device 30 can be arranged such that the first high linear field 34.1*h* and the first low linear field 34.1*b* as well as the second high linear field 34.2*h* and the second low linear field 34.2*b* each intercept the theoretical free fall paths of several glass gobs formed at the same time by the same glass source. Indeed, "multigob" distributors are quite widespread and they generally deliver 2, 3 or 4 gobs in parallel by means of sometimes independent 2, 3 or 4 plungers with 2, 3, or 4 tank orifices and 2, 3 or 4 pairs synchronous or asynchronous scissors.

In this case, we can therefore define, for each given theoretical free fall path and for each of the four linear cameras 32.1*h*, 32.2*h*, . . . of the measuring device 30, an axis of observation 37.1*h*, 37.2*h*, . . . , of the given theoretical free fall path by the considered camera. This axis of observation 37.1*h*, 37.2*h*, . . . , of the given theoretical free fall path, by the considered linear camera, is an axis contained in the linear field 34.1*h*, 34.2*h*, . . . of the considered linear camera 32.1*h*, 32.2*h*, . . . , which passes through the optical center of the lens 33 of the considered camera, and which intercepts the given theoretical free fall path, for example the second theoretical free fall path 28'.24, in the sense that this axis of observation intersects this given theoretical free fall path 28'.24 at the corresponding point of interception. Under these conditions, the measuring device 30 makes it possible to measure the kinematic characteristics of the free fall of a glass gob falling along the first theoretical free fall path 28.24, but also of a glass gob falling along the second theoretical vertical path free fall 28'.24 which is also intercepted by the linear fields 34.1*h*, 34.2*h*, . . . of the four linear cameras 32.1*h*, 32.2*h*, . . . of the measuring device 30. Note that, when the optical axis 36.1*h*, 36.2*h*, . . . of a linear camera 32 intercepts a given theoretical free fall path (which is the case for the first theoretical free fall path 28.24 as represented in particular in FIG. 6), the optical axis 36.1*h*, 36.2*h*, . . . of the considered linear camera 32 and the axis of observation 37.1*h*, 37.2*h*, . . . connecting the given theoretical free fall path 28.24 to the optical center of the lens of the considered linear camera 32.1*h*, 32.2*h*, . . . are coincident.

In the example illustrated in FIG. 6, it is understood that the optical axis 36.1*h*, 36.2*h*, . . . of each of the linear cameras 32.1*h*, 32.2*h* intercepts the same theoretical free fall path among a plurality of theoretical free fall paths which are intercepted by the linear fields 34.1*h*, 34.2*h*, . . . of the four linear cameras 32.1*h*, 32.2*h*, . . . of the measuring device 30. However, as a variant, we could arrange the measuring device 30 such that, while having its four linear cameras disposed such that the linear fields 34.1*h*, 34.2*h*, . . . of the four linear cameras 32.1*h*, 32.2*h*, . . . intercept a plurality of theoretical free fall paths, the optical axes 36.1*h*, 36.2*h*, . . . of the linear cameras 32.1*h*, 32.2*h* do not intercept any of the theoretical free fall paths of said plurality of theoretical free fall paths, or such that the optical axes 36.1*h*, 36.2*h*, . . . of the linear cameras 32.1*h*, 32.2*h* do not all intercept the same theoretical free fall path of said plurality of theoretical free fall paths. We can thus have a configuration in which the optical axes of the first high camera and of the first low camera intercept a first theoretical free fall path (without intercepting a second theoretical free fall path) and in which the optical axes of the second high camera and of the second low camera intercept the second theoretical free fall path (without intercepting the first theoretical free fall path).

In the example illustrated in the figures, the first high optical axis 36.1*h* of the first high camera 32.1*h* and the first low optical axis 36.1*b* are superimposed in the same vertical plane and are moreover parallel to each other. Such parallelism will promote the accuracy of the measurements and will facilitate the determination of the kinematic equations involved. However, this parallelism is not mandatory. We will also advantageously provide that, as in the illustrated example, the second high optical axis 36.2*h* of the second high camera 32.2*h* and the second low optical axis 36.2*b* are superimposed in the same vertical plane, and even more advantageously, that they are moreover parallel to each other.

Preferably, the optical axes 36 of the four linear cameras 32 of the measuring device 30 are all horizontal, therefore orthogonal to the direction of the theoretical vertical free fall path(s), this just as well in the case where one of these optical axes intersects one of these theoretical vertical paths, as in the case where one of these optical axes does not intersect this or these theoretical vertical path(s). In this case, the axes of observation 37.1*h*, 37.2*h*, . . . connecting the point of interception of a given theoretical free fall path 28.24 to the optical center of the lens of the corresponding linear camera 32.1*h*, 32.2*h*, . . . are also horizontal, whatever the theoretical free fall path.

Preferably, the first high point of interception 40.1*h*, 40'.1*h* and the second high point of interception 40.2*h*, 40'.2*h* will be coincident for a given theoretical free fall path 28.24, 28'.24. In other words, in this case, the first high camera 32.1*h* and the second high camera 32.2*h* are arranged such that they see, through their lenses, the same point of the theoretical vertical free fall path of the gob. In the same way, preferably, the first low point of interception 40.1b, 40'.1b and the second low point of interception 40.2b, 40'.2b will be coincident for a given theoretical free fall path 28.24, 28'.24.

As can be understood from the foregoing, the measuring device 30 thus comprises four linear cameras 32 which, together, can be considered as forming two groups of two cameras, with a high group of cameras that comprises the first high camera 32.1h and the second high camera 32.2h, and a low group of cameras that comprises the first low camera 32.1b and the second low camera 32.2b.

Preferably, the two cameras of the high group of cameras acquire linear images which contain the same high point of interception 40.1h of the theoretical vertical free fall path 28.24, and which therefore, upon passage of a gob through this point, acquire linear images of the same segment of the gob. As the two cameras of the high group of cameras are disposed at different points in space relative to the high point of interception 40.1h, we obtain linear images of the same segment of the gob from two distinct points of view, which will make it possible to determine geometric and positional characteristics of this segment along two distinct horizontal directions, by stereovision. The same is true for the two cameras in the low group of cameras. In the example, the two cameras of the high group of cameras are disposed so that their respective optical axes form together, around the theoretical vertical free fall path 28.24, a non-zero angle Aopth and different from 180 angle degrees. Typically, the two cameras of the high group of cameras are disposed so that their respective optical axes form together, around the theoretical vertical free fall path 28.24, an angle Aopth comprised in the range from 5 to 90 angle degrees.

Moreover, the four linear cameras 32 of the measuring device can, together, be considered as forming two sets of two cameras, each set comprising a high camera and a low camera. With a set of cameras comprising a high camera and a low camera, we will be able to determine some kinematic characteristics of the free fall of a glass gob. With the two sets of cameras, each comprising a high camera and a low camera, but the optical axes of the cameras belonging to two different sets forming together a non-zero angle different from 180 angle degrees, we will be able to determine the kinematic characteristics in three dimensions of the free fall of the glass gob.

Indeed, the measuring device 30 includes or is connected to an electronic calculation unit 42 programmed to implement a method for measuring the kinematic characteristics of the free fall of a glass gob when the free fall path of the gob intercepts the four linear fields of the four linear cameras 32 of the measuring device 30. The electronic calculation unit 42 can be made, for example, in the form of an acquisition card and/or a computer within the installation 11, and it collects the series of successive linear digital images acquired by each of the four cameras 32 of the measuring device 30. The electronic processing unit 42 can be dedicated only to the measuring device 30 or can be shared with other equipment of the installation 10.

The example of FIG. 1 illustrates that the installation 10 includes a control and monitoring computer system 44 the electronic calculation unit 42 of which can form part of it, or with which the electronic calculation unit 42 can communicate computationally. Indeed, in such an installation, the operation of all the elements is necessarily coordinated and follows regular cycles. For example, the distributor 20 is monitored by a control and monitoring central unit of the installation according to the cycle of the forming machine 11. The forming machine 11 generally also includes one or more control unit(s) monitoring for example the opening and the closing of the molds 14 of the different sections one after the other, controlling the forming operation(s), possibly controlling a member for transferring the blanks to finishing molds or means for transferring the container formed from the blow mold to a container transport conveyor, controlling the forehearth which brings the molten glass at a chosen temperature to the glass source 18, also controlling the operation of one or more plungers 17 and/or of the cylinder 19 of the glass source 18, controlling the shear(s) 22 etc. The electronic control units of the machine and/or of the installation which can be disjoint or coincident but which belong to the control and monitoring computer system 44 of the installation, therefore necessarily have information relating to the operating cycles of the machine and of its various forming sections. The computer system 44 can comprise at least one standard computer, therefore including at least one microprocessor, one or more electronic memory units and one or more display (screen, projector, holographic display, etc.), input (keyboard, mouse, touchpad, touch screen, etc.), and/or communication (USB, Ethernet®, Wi-Fi®, Bluetooth®, Zigbee®, etc.) interfaces. The computer system can comprise a computer network sharing data with one or more other computers on the network, or with other networks, for example by an Internet or Ethernet® protocol. In addition to its obvious connection to the linear cameras 32, the computer system 44 can be connected to sensors providing information on the status of the installation, and/or to actuators of the installation (conveyors, ejectors, etc.). The computer system implements one or more software(s) stored and/or executed locally or remotely, including on one or more remote computer servers. This or these software(s) preferably comprise one or more software(s) programmed to implement the method for measuring the kinematic characteristics of the free fall of a gob as will be described below. In particular, the electronic calculation unit 42 can be programmed to implement such a method.

First of all, the method can comprise the acquisition, for example using the distinct four linear cameras 32 of a measuring device 30 as described above, of at least four series of successive linear digital images, each image of a given series of linear images being the linear image of an observed field of the free fall area acquired by one of these four linear cameras 32.

The four series of linear images thus comprise a first high series acquired by the first high camera 32.1h, a first low series acquired by the first low camera 32.1b, a second high series acquired by the second high camera 32.2h, and a second low series acquired by the second low camera 32.2b. The four series of linear images thus acquired correspond to linear images respectively of the first high linear field 34.1h, of the first low linear field 34.1b, of the second high linear field 34.2h and of the second low linear field 34.2b in the free fall area, for example the high free fall area 24.

For a given theoretical free fall path, the images of the four series of linear images each comprise an image of the corresponding point of interception 40.1h, 40.1b, 40.2h, 40.2b and are therefore acquired respectively along a first high axis of observation 37.1h, a first low axis of observation 37.1b, a second high axis of observation 37.2h and a second low axis of observation 37.2b, distinct from each other and determined by the corresponding linear camera in the manner described above, the axis of observation passing through the point of interception and through the optical center of the camera that corresponds to the considered series.

For a given theoretical free fall path, for example either of the two theoretical free fall paths 28.24 and 28'.24 of FIG. 6, the first and second high axes of observation form together, in perpendicular projection on a plane perpendicular to the direction of the theoretical free fall path, a high deviation angle of observation Aobsh, Aobsh' different from 0 angle degree and different from 180 angle degrees around the theoretical free fall path. Thus, two linear images of the same segment of the gob are acquired from two different points of view, and under two different directions of observation, not aligned, which makes it possible, according to the principle of stereovision, to determine geometric and positional characteristics of the gob along two horizontal directions. Preferably, the high deviation angle of observation Aobsh Aobsh' is comprised in the range from 10° to 170° of angle around the theoretical free fall path. With a minimum angle of 10 angle degrees between the directions of the two axes of observation, we make sure that there is a sufficient difference between the points of view to have sufficient accuracy as to the geometric and positional characteristics of the gob along two horizontal directions perpendicular to each other, by noting that the axes of observation do not need to be perpendicular to each other to obtain geometric and positional characteristics of the gob along two horizontal directions perpendicular to each other. Note that the high deviation angle of observation Aobsh Aobsh' can be advantageously comprised in the range from 10° to 45°, or in the range from 10° to 25°, to increase the compactness of the device and to facilitate its integration into the installation. This can result in a deviation angle of high optical axis Aopth comprised in the range from 10° to 45°, or even in the range from 10° to 25°.

Similarly, for a given theoretical free fall path, for example either of the two theoretical free fall paths 28.24 and 28'.24 of FIG. 6, the first and second low axes of observation 37'.1b, 37'.1h preferably form together, in perpendicular projection on a plane perpendicular to the direction of the theoretical free fall path, a low deviation angle of observation Aobsb, Aobsb' different from 0 angle degree and different from 180 angle degrees around the theoretical free fall path, with the same advantage. Similarly, the low deviation angle of observation is preferably comprised in the range from 10° to 170° of angle around the theoretical free fall path to obtain, with sufficient accuracy, geometric and positional characteristics of the gob along two horizontal directions perpendicular to each other. Similarly, the low deviation angle of observation Aobsb Aobsb' can be advantageously comprised in the range from 10° to 45°, or in the range from 10° at 25°, to increase the compactness of the device and to facilitate its integration into the installation. This can result in a deviation angle of low optical axis Aoptb comprised in the range from 10° to 45°, or in the range from 10° to 25°.

The time deviation between the acquisition of any two images of the same series, therefore acquired by the same linear camera 32, and between any two images of two distinct series, therefore acquired by two distinct linear cameras of the measuring device 30, is determinable. For example, the time deviation between the acquisition of two consecutive images of the same series is predetermined, preferably constant, at least with a known variation or according to a known function, so that it suffices to know the instant of acquisition of an image of a series to be able to determine the time deviation between the acquisition of any two consecutive or non-consecutive images of this series. Similarly, it suffices, for example, to know the time deviation between the acquisition of a reference image of a first series (for example an image containing an identifiable point of the gob) and the acquisition of a reference image of another series (for example an image containing the same identifiable point of the gob) to be able to determine the time deviation between the acquisition of any two images of two distinct series.

FIG. 4-5A-5E Illustrates different successive positions of a gob on its theoretical free fall path 28.24 when this gob passes in front of the measuring device 30.

FIG. 4 illustrates the gob P at the instant td1h at which its start end Pd is at the high point of interception 40.1h of a set of linear cameras 32, here for example the first set of two linear cameras 32.1 h, 32.1b. FIG. 5A illustrates the same gob P at a later instant at which its start end Pd has exceeded the high point of interception 40.1h, but has not yet reached the low point of interception 40.1b of the same set of linear cameras 32. FIG. 5B illustrates the same gob P at a later instant td1b at which its start end Pd reaches the low point of interception 40.1b. Note that the tail end Pf of the gob P has not yet reached the high point of interception 40.1h, which reflects the fact that the vertical offset between the high point of interception and the low point of interception of this set of linear cameras, here the first set of linear cameras, is strictly less than the length of the gob. Although not illustrated, there is a later instant at which the two linear cameras of the set of linear cameras observe two different segments of the gob P, these two segments being different from the end segments of the gob. FIG. 5C illustrates the same gob P at a later instant tf1h at which its tail end Pf is at the high point of interception 40.1h of the set of linear cameras 32. FIG. 5D illustrates the same gob P at a later instant at which its tail end Pf has exceeded the high point of interception 40.1h, but has not yet reached the low point of interception 40.1b of the same set of linear cameras 32. At this instant, the low camera, here the first low camera 32.1b still observes a segment of the gob P which is located between the start end Pd and the tail end Pf of the gob P. FIG. 5E illustrates the same gob P at a later instant tf1b at which its tail end Pf reaches the low point of interception 40.1b. It is recalled that the device 30 makes it possible to measure the characteristics of the gobs in an installation in which it is not possible to have a field of observation encompassing an entire gob. Note that a vertical offset is chosen between the high point of interception and the low point of interception of the sets of linear cameras which is for example comprised in the range from 10 mm to 100 mm. In most applications, this vertical offset is therefore less than the nominal length of the gobs, which can be for example comprised in a range from 100 to 250 mm, for example 150 mm. The nominal length of the gobs is adjustable. Obviously, a device 30 as described works even if the actual gobs have a length less than the vertical offset between the high point of interception and the low point of interception of the sets of cameras. We can indeed for example adjust the installation to produce gobs of a length less than the nominal length, for example 80 mm while, if the environment of the installation allows it, the vertical offset between the high point of interception and the low point of interception of the sets of linear cameras can be greater than this gob length, for example equal to 100 mm. The measuring method and device as described still work this time with a different sequence of the instants of coincidence of the ends with the high and low points of interception which that be in the following order: td1h, tf1h, td1b, tf1b.

In a given series, the time deviation between the acquisition, by the linear camera 32 corresponding to this series, of two successive images, namely the period of acquisition of the linear camera 32, is sufficiently reduced for the linear camera 32 to acquire several successive images of the gob in the space of time that separates the passage of the start end Pd of the gob relative to the passage of the tail end Pf of the same gob P in the linear field 34 of the linear camera 32. Preferably, in the time interval that separates the passage of the start end Pd of the gob P relative to the passage of the tail end Pf of the same gob P in the linear field 34 of the linear camera 32, the linear camera 32 acquires for example between 1 and 100 linear images for 1 mm gob, for example 10 images for 1 mm gob. In other words, for an 18 cm high gob, the linear camera 32 acquires about 1,800 linear images of the gob. As a result, we will preferably chose linear cameras whose acquisition frequency will be of at least 5 kHz, preferably at least 10 kHz, for example 40 kHz.

Typically, we can use cameras whose linear photoelectric sensor is formed of a line of at least 512 photoelectric elements, preferably at least 1,024 or 2,048 or more, on the condition of preserving an acquisition frequency greater than 5 kHz, preferably greater than 10 kHz for good accuracy in the vertical quantities.

Note that, if the fields 34.1$h$ and 34.2$h$ (respectively 34.1$b$ and 34.1$h$) are parallel to each other, they therefore define the same angle of view relative to the horizontal then, for a given segment acquired by the two linear cameras of the same group, the acquired linear images of this segment by the two linear cameras of the same group are images of this same segment according to the same angle of view relative to the horizontal, in particular for the start or tail segments of the gob. Similarly, if the fields 34.1$h$ and 34.1$b$ (respectively 34.2$h$ and 34.2$b$) are parallel to each other, they define the same angle of view relative to the horizontal, then, for a given segment acquired by the two linear cameras of the same set of cameras, the acquired linear images of this segment by the two linear cameras of the same set are images of this same segment according to the same angle of view relative to the horizontal. In both cases, this makes it possible to make the detection of the instant of passage of such a start or tail end of the gob independent of the shape of this end. This is welcome insofar as the shape of such an end depends on the cutting operation carried out by the shear and it can have different profiles according to the point of view from which it is observed, therefore according to the angle of view relative to the horizontal, therefore following the linear camera of the group or of the set whose image is considered. It is even more advantageous that the four fields are parallel to each other. The device is designed to provide the best possible parallelism of the fields 34.1$h$, 34.2$h$, 34 1$b$ and 34.1$h$, knowing that the accuracy of positioning of the sensors and lenses in space is limited by the accuracy of the mechanical-optical assemblies.

FIG. 8 illustrates the set of linear images acquired by a given linear camera during the passage time of a gob P in the linear field of said linear camera. This set of images is a portion of a larger series of images, namely the series of linear images acquired by the given linear camera during an operation time of the camera. This set is determined by computationally identifying a linear image of the series, called gob start image I1, in which appears the image of the start end Pd of the gob, and a linear tail image IL of the gob in which appears the image of the tail end of the same gob. This set of images therefore consists of a number L of successive linear images acquired by the linear camera 32: I1, I2, I3, . . . , I(i−1), Ii, . . . , I(L−2), I(L−1), IL. In each image, the presence or absence of an image of a segment of the gob can be determined computationally, for example by detection of the contrast between the gob, recalling that is very luminous in the visible range, and the background.

It is understood that for the same gob P, we thus obtain 4 sets of images each corresponding to one of the linear cameras 32. For each set, we can easily identify computationally in each respective series the first image of the set namely the gob start image I1, in which appears the image of the start end Pd of the gob, for example as being the first image comprising an image of the gob following several images of the series not including an image of the gob. We can also easily identify computationally in each series, the linear tail image of the set, IL, in which appears the image of the tail end Pf of the gob, for example as being the last image of the series comprising an image of the gob before several successive images of the series not including an image of the gob. On the other hand, for the intermediate images between the gob start image I1 and the end image IL of the gob, we cannot, by simple analysis of the image, accurately determine of which gob segment it contains the image. Indeed, throughout its fall, we consider that the gob is subjected to the sole action of Earth's gravity, which means that it has a constant acceleration equal to Earth's gravity, and therefore a speed which varies at any instant. Also, the method then provides for matching, for the intermediate linear images comprising the image of a segment of the gob other than its two start and tail ends, the image of the gob contained in the intermediate linear image with a corresponding segment of the gob.

From two series of linear images corresponding to two cameras of the same set of linear cameras 32, that is to say corresponding to a high camera and a low camera, we can determine an average vertical speed ($Vz\_moy\_d$ and/or $Vz\_moy\_f$) of one end (therefore of an end segment) of the gob between the two high and low points of interception corresponding to this set of linear cameras. This involves the computer identification of a high linear image and a low linear image each comprising an image of the same given end of the gob among the start end and the tail end of the gob and the deduction a time deviation between the acquisition of the high linear image and the acquisition of the low linear image.

We can thus determine, for example from the determination of the start image I1.1$h$ of the gob (respectively the tail image IL.1$h$ of the gob) in the high series of linear images corresponding to the high camera, and of the start image I1.1$b$ of the gob (respectively the tail image IL.1$b$ of the gob) in the low series of linear images corresponding to the low camera, the time deviation between the acquisition of these two images. For the case of two high and low linear cameras whose image acquisition period is the same acquisition constant Ta (namely an acquisition frequency Fa=1/Ta), and which are synchronized, this time deviation is equal to Od/Fa (respectively Of/Fa), where Od is the number of image acquisition periods between the acquisition of the gob start image I1$h$ in the high series of linear images, and the acquisition of the gob start image I1.1$b$ in the low series of linear images corresponding to the low camera (respectively Of is the number of image acquisition periods between the acquisition of the tail image IL.1$h$ of the gob in the high series of linear images, and the acquisition of the end image IL.1$b$ of the gob in the low series of linear images).

We can also know the actual distance D between the two high and low points of interception corresponding respectively to these two high and low linear cameras of the measuring device, by construction, but preferably for example by a prior step of calibration the measuring device. D is a function of the considered set of cameras, but can also depend on the position of the path of the gob in the high and low images of a set of cameras.

The average vertical speed of the start end of the gob Vz_moy_d (respectively of the tail end of the gob Vz_moy_f) is then the actual distance D between the two high and low points of interception, divided by the time deviation between the two start images I1.1$h$ and I1.1$b$ of the gob (respectively between the two tail images IL.1$h$, IL.1$b$ of the gob) in the two high and low series. Returning to the example of FIG. 4 and FIGS. 5A to 5E, we have for example:

$Vz\_moy\_d=D/(td1b-td1h)$; and/or $Vz\_moy\_f=D/(tf1b-tf1h)$ which can also be written:

$Vz\_moy\_d=D*Fa/Od$; and/or $Vz\_moy\_f=D*Fa/Of$

Note that this average vertical speed can be obtained by using only two of the four series of linear images, corresponding to a set of linear cameras comprising a high camera and a low camera (we indicated the use of the first set cameras in the example above). However, we can perform this same calculation with the other two series of linear images, corresponding to the other set of linear cameras comprising the other high camera and the other low camera. If the two sets of cameras are arranged such that they have the same high point of interception and the same low point of interception, the result should be the same. In reality, measurement errors may give slightly different results. In this case, we can choose to determine the average vertical speed of a given end of the gob between the high and low points of interception as being the arithmetic mean of the two average vertical speeds of this end, these two average speeds being calculated respectively with either of the two sets of linear cameras.

The method moreover provides for the computer calculation of an instantaneous speed of vertical translation for at least one given end of the gob upon passage of this given end of said gob at one among the high and low points of interception. This instantaneous speed can be indeed deduced from the time deviation between the acquisition of the high linear image of this given end and the acquisition of the low linear image of this given end, and by application of the law of kinematics of the free falling bodies.

Indeed, we arbitrarily take, for reasons of simplicity of calculation, as origin of the times, an instant t0=0, at which the gob P begins the free fall vertically according to the vertical fall path, subject to the only Earth's gravity "g" with a zero initial vertical speed. For example, this instant could correspond to the instant at which the gob P is cut by the shear 22 and begins to fall. Therefore, from this instant, taken as origin of the time measurement, the vertical instantaneous speed of any point of the gob evolves as a function of time t according to the relation:

$Vz\_inst\_par(t)=g*t$

Note that it is not mandatory to choose the origin of the times t0=0 corresponding to a zero speed moment. The origin of the times t0 can be chosen arbitrarily, but preferably after the instant when the gob P is cut by the shear 22 and begins to fall. We can thus choose the origin of the times t0 between the instant when the gob P is cut by the shear 22 and the instant of acquisition of the first image containing the gob P by at least one of the two high cameras. With such a convention, at this origin of the times t0=0, the speed of the gob is the speed v0 of the gob at the origin of the times, which is non-zero. But even in this case, the speed v0 of the gob at the origin of the times can be determined in four different ways. Using the gob start point and the first set of cameras, the speed v0 of the gob at the origin of the times is given by the relation: $v0=D/(td1b-td1h)-0.5*g*(td1b+td1h)$. Using the tail point of the gob, and the second set of cameras for the two start and tail points of the gob, we can determine a total of four times the value of v0 with the following relations:

$v0=D/(tf1b-tf1h)-0.5*g*(tf1b+tf1h)$ $v0=D/(td2b-td2h)-0.5*g*(td2b+td2h)$ $v0=D/(tf2b-tf2h)-0.5*g*(tf2b+tf2h)$.

Note that, still in this hypothesis where this speed v0 of the gob at the origin of the times was chosen arbitrarily for an origin of the times t0 after the instant when the gob P is cut by the shear 22 and that it begins to fall, we can choose to use the arithmetic mean of the values obtained by the 4 relations above, to average the inevitable measurement inaccuracies.

In both cases, if we consider for example the start end Pd of the gob P, and the series of linear images acquired by the first set of linear cameras 32.1$h$ and 32.1$b$ then, between the instant td1$h$ of passage of the start end Pd of the gob at the high point of interception 40.1$h$ and the instant td1$b$ of passage of the start end Pd of the gob at the low point of interception 40.1$b$, the instantaneous vertical speed of the start end Pd of the gob varies from:

Vz_inst_d.1h=Vz_inst_par (td1$h$), at the first high point of interception to

Vz_inst_d.1b=V_inst_par (td1$b$) at the first low point of interception with $Vz\_inst\_par(td1b)-Vz\_inst\_par(td1h)=g*(td1b-td1h)$ with $td1b-td1h=Od/Fa$ so that $Vz\_inst\_d.1b-Vz\_inst\_d.1h=g(td1b-td1h)=g*Od/Fa$ But as moreover $Vz\_moy\_d=[Vz\_inst\_par(td1b)+Vz\_inst\_par(td1h)]/2=D*Fa/Od$ in so that:

$Vz\_inst\_d.1h=Vz\_moy\_d-[Vz\_inst\_d.1b-Vz\_inst\_d.1h]/2$ then, we obtain that the instantaneous vertical speed Vz_inst_d.1h of the start end Pd of the gob at the first high point of interception 40.1$h$ is equal to:

$Vz\_inst\_d.1h=(D*Fa/Od)-(g*Od/2*Fa)$ and that the instantaneous vertical speed Vz_inst_d.1b of the start end Pd of the gob at the first low point of interception 40.1$b$ is equal to:

$Vz\_inst\_d.1b=(D*Fa/Od)+(g*Od/2*Fa)$

Similarly, we can demonstrate that the instantaneous vertical speed Vz_inst_f.1h of the tail end Pf of the gob, at the first high point of interception 40.1$h$ is equal to:

$Vz\_inst\_f.1h=(D*Fa/Of)-(g*Of/2*Fa)$ and that the instantaneous vertical speed Vz_inst_f.1b of the tail end Pf of the gob at the first low point of interception 40.1*b* is equal to:

$$Vz\_inst\_f.1b=(D*Fa/Of)+(g*Of/2*Fa)$$

We thus determined by computer calculation the instantaneous speed of vertical translation of a given end of said gob, for example the instantaneous speed of vertical translation Vz_inst_d.1h of the start end Pd, upon passage of this given end of the gob at the point of interception, here the high point of interception, corresponding to said instantaneous speed of vertical translation of the given end of said gob.

Note that we worked here, for a given end, with a set of two series of high and low images acquired with a given set comprising a high camera and a low camera. We thus calculated a first instantaneous speed of vertical translation of said given end of the gob during the passage of the given end of said gob at one among the high and low points of interception (this speed was given on the one hand for the start end and for the tail end, and on the other hand for the high point of interception and for the low point of interception), based on the first high series and the first low series of linear images. We can course make the same computer calculation, for the same given end (therefore concerning the start end and/or the tail end, this for the passage of the end at the level of the high point of interception and/or at the level of the low point of interception), with the other of the two sets of two series of high and low images acquired with the other set comprising the other high camera and the other low camera. We can also calculate a second instantaneous speed of vertical translation of said given end of the gob during the passage of the given end of said gob at one among the high and low points of interception, based on the second high series and the second low series of linear images. The result should be the same. In reality, measurement errors may give slightly different results. In this case, we can choose to determine the instantaneous speed of vertical translation of said given end of the gob during the passage of the given end at one among the high and low points of interception as being the arithmetic mean of the first and of the second instantaneous vertical speeds of this end, these two average speeds being calculated respectively with either of the two sets of linear cameras.

Thanks to this, it is possible to match, for the intermediate linear images comprising the image of an intermediate segment of the gob, other than its two start Pd and tail Pf ends, of the image of the gob contained in the intermediate linear image with a corresponding segment of the gob. To do so, the law of kinematics of the free falling bodies is applied as a function of said instantaneous speed of vertical translation of the given end of said gob upon passage of the given end of the gob at the point of interception corresponding to said instantaneous speed of vertical translation of the given end of said gob, and of the time elapsed between the acquisition of said considered intermediate linear image and said passage of said end of the gob at the point of interception corresponding to said instantaneous speed of vertical translation of the given end of said gob.

This matching is illustrated symbolically in FIG. 7 and in FIG. 8. As indicated above, FIG. 8 illustrates the set of linear images acquired by a given linear camera during the time of passage of a gob in the linear field of said linear camera. This set of images here consists of a number L of successive linear images acquired by the linear camera 32: I1, I2, I3, . . . , I(i−1), Ii, . . . , I(L−2), I(L−1), IL. Also, FIG. 7 and in FIG. 8 illustrates an axis S representing the vertical direction with, on this axis, a vertical coordinate S1 which corresponds to the start end Pd of the gob. This vertical coordinate S1 is a relative coordinate which is linked to the gob P, more specifically linked to the start end Pd of the gob and which does not necessarily correspond to an absolute coordinate of the start end Pd of the gob in space or on the theoretical free fall path. We can therefore arbitrarily take the convention that S1=0. Similarly, we define arbitrarily that the values of S are increasing in the direction from the start end Pd of the gob to the tail end Pf of the gob. The axis S is therefore a reference frame linked to the gob, this reference frame being a single vertical graduated axis. As indicated above, we know how to computationally recognize, in the set of linear images of the gob, the start image I1 which corresponds to the start end Pd of the gob, and we can therefore match the start image I1 and the vertical coordinate S1 representative of the start end Pd of the gob.

Next, we indicated that the time deviation between the acquisition of any two images of the same series is determinable. For example, the time deviation between the acquisition of two successive images of the same series is constant or follows a known function. In this way, for all the intermediate linear images Ii of the set that follow the start image I1, namely in the example, the images I2, I3, . . . , I(i−1), Ii, . . . , I(L−2), I(L−1), IL, we can determine the instant of acquisition ti of the intermediate linear image.

To perform this matching, we can start by determining the positional deviation hi between two considered segments of the gob whose respective images are contained in two consecutive linear images I(i−1) and Ii of a given series of linear images.

These two images were taken at two successive acquisition instants t(i−1) and ti.

We can take the convention that, at the instant ti, it is a segment Pi of the gob, which has the vertical coordinate Si=S(ti) on the gob, that is at the point of interception corresponding to the studied series (therefore the first high point of interception if we consider the first high series). This segment Pi is therefore the one that appears in the image Ii. Similarly, the vertical coordinate S[i−1]=S(t(i−1)), is the vertical coordinate, on the gob P, of the segment P(i−1) of the gob which, at the instant t(i−1), is at the same point of interception corresponding to the studied series (here also therefore the first high point of interception). This segment P (I−1) is therefore the one that appears in the image I(i−1).

With this convention, the positional deviation hi between two considered segments of the gob whose respective images are contained in two consecutive linear images I(1-1) and Ii of a given series of linear images can therefore be written: hi=S(ti)−S(t(i−1)). The positional deviation hi can also be considered as being the relative displacement of the gob relative to the linear field of the camera considered between the instants ti−1 and ti, the speed of this displacement being the instantaneous speed of free fall of the gob for example Vz_inst_f.1h at the instant ti.

We can take as a reference the instant t1 that corresponds to the acquisition of the start image I1 for the considered series. However, for the first high series, this instant t1 is the instant td1*h* that was discussed above corresponding to the passage of the start end Pd of the gob at the first high point of interception 40.1*h*. It was seen above that S1 referred to the vertical coordinate that corresponds to the start end Pd of the gob. We have therefore S(t1)=S1. It was seen above that we can take the convention that S(t1)=S1=0.

However, it is assumed that, in general, the instantaneous vertical speed of the gob is, for any point of the gob:

$$Vz\_inst\_par(ti)=g*(ti-t1)+Vz\_inst\_par(t1)$$

With integration with respect to time, we determine the vertical coordinate S(ti), on the gob, of the segment Pi of the gob which, at the instant ti, is at the point of interception corresponding to the studied series. This segment is therefore the one that appears in the image Li of the corresponding series:

$$S(ti)=(\tfrac{1}{2})*g*(ti-t1)^2+Vz\_inst\_par(t1)*(ti-t1)+S1$$

Thus, for the first high series, with t1=td1h and with the notation Vz_inst_par (td1h)=Vz_inst_d.1h, we then have:

$$Vz\_inst\_par\,(ti) = g*(ti-td1h) + Vz\_inst\_d.1h$$
$$= g*(ti-td1h) + (D*Fa/Od) - (g*Od/2*Fa)$$

and, with integration with respect to time, we determine the vertical coordinate S(ti), on the gob, of the segment of the gob which, at the instant ti, is at the first high point of interception. This segment is therefore the one that appears in the image Li of the first high series:

$$S(ti)=(\tfrac{1}{2})*g*(ti-td1h)^2+Vz\_inst\_d.1h*(ti-td1h)+S1$$

In this way, we can easily calculate the positional deviation hi=S(ti)−S(t(i−1)) mentioned above.

We can also easily calculate, in a given series, the height H of the gob P as being the difference between the vertical coordinate SL which corresponds to the tail end Pf of the gob (which is acquired at the instant tL, with therefore SL=S(tL)), and the vertical coordinate S1 which corresponds to the start end Pd of the gob, with the formula H=SL−S1=S(tL)−S(t1)

In the example illustrated, the time deviation between the acquisition of two successive images of the same series is constant so that, for the first high series, ti−td1h=i*Ta=i/Fa, so that we can obtain:

$$S(ti) = (i^2)*g/(2*Fa^2) + i*(D/Od) - (g*Od/2*Fa)*i/Fa + S1$$
$$= (i^2)*g/(2*Fa^2) + i*[(D/Od) - (g*Od/)2*Fa^2)] + S1$$

Thus, we are able to express the positional deviation hi, and/or the vertical coordinate S(ti), on the gob, of the segment Pi of the gob which, at the instant ti, is at the point of interception corresponding to the studied series, as a function of:
- the number of linear images in the series determined between, on the one hand, one Ii of the consecutive linear images comprising one of the two considered segments and, on the other hand, in the example developed above, the start linear image of the determined series, comprising an image of the start end of the gob;
- the instantaneous speed of vertical translation of the start end of the gob upon passage of the start end of said gob at the point of interception corresponding to the determined series, in the example the high point of interception;
- a frequency "Fa" of acquisition of the linear images for the determined series; and
- the gravitational constant "g".

We could have expressed the positional deviation hi, and/or the vertical coordinate S(ti), on the gob, of the segment Pi of the gob which, at the instant ti, is at the point of interception corresponding to the studied series, as a function of:
- the number of linear images in the series determined between, on the one hand, one Ii of the consecutive linear images comprising one of the two considered segments, and on the other hand, in another example developed above, the tail linear image of the determined series, comprising an image of the tail end of the gob;
- the instantaneous speed of vertical translation of the tail end of the gob upon passage of the tail end of said gob at the point of interception corresponding to the determined series, in the example the high point of interception;
- a frequency "Fa" of acquisition of the linear images for the determined series; and
- the gravitational constant "g".

According to still other examples, we could have used a series of low linear images.

Thus, we are led to determine, for each linear image of the set of linear images acquired by a given linear camera during the time of passage of a gob in the linear field of said linear camera, the position, on the gob, of the gob segment which is imaged in the image. In this way, we are capable, by computer analysis of all or part of this set of images, to determine geometry characteristics (width of the segment, absolute position of the segment in space) at the point of interception corresponding to this given linear camera.

By carrying out this matching operation for several segments of the gob, this for two series corresponding to a first set of linear cameras of the device, comprising a high camera and a low camera, we can determine, for these several segments, horizontal displacement characteristics, along a first horizontal measurement direction, of the segments between the high and low points of interception.

By carrying out this matching operation for several segments of the gob, this for two series corresponding to a second set of linear cameras of the device, comprising a high camera and a low camera, the cameras of the second set being distinct from those of the first set and observing their respective points of interceptions along distinct axes of observation from those of the first set, we can determine, for these several segments, along a second horizontal measurement direction, characteristics of horizontal displacements of the segments between the high and low points of interception.

Thus, with the measuring device 30, we can implement this matching operation for several segments of the gob, this for the four series of linear images corresponding to the first and second sets of linear cameras of the device 30.

In particular, we can thus for example provide for determining computationally, for at least two distinct segments of the gob:
- the set of first and second amounts of horizontal translation of the segment, respectively along a first horizontal measurement axis and along a second horizontal measurement axis, distinct from each other, between the high and low points of interception
- or the set of first and second average speeds of horizontal translation of the segment, respectively along a first horizontal measurement axis and along a second horizontal measurement axis, distinct from each other, between the high and low points of interception.

An amount of horizontal translation of a segment along a horizontal measurement axis corresponds to a horizontal offset, or difference in horizontal position of this segment in space between the high and low points of interception.

The determination of an amount of horizontal translation of a segment, between a high point of interception and the corresponding low point of interception, can for example comprise the detection of the position of at least the same point of the segment in the high linear image and in the low linear image of the corresponding high series and low series of the same set of cameras.

This same point of the segment, whose position is determined in the high linear image and in the low linear image of the corresponding high series and low series, can be an edge point of the segment, therefore corresponding to an edge of the segment of the gob as seen in the linear image, therefore to a point of the outer side wall of the gob, where it is recalled that it is generally cylindrical or substantially cylindrical.

This same point of the segment can be a midpoint between two edge points of the segment, these two edge points therefore corresponding to the two edges of the segment of the gob as seen in the linear image, therefore to the two diametrically opposite points of the outer side wall of the gob when it is cylindrical or substantially cylindrical.

FIG. 9 schematically illustrates a possibility of carrying out the determination of the position in the plane determined by the optical axes of two cameras belonging to the same group of cameras, of a point of a gob segment using the device 30 according to the invention. More specifically, we will explain below a method for determining the position of a point of a gob segment using two images of the same segment belonging to two series of linear images each acquired respectively by a first and a second camera of the same (high or low) group of two linear cameras of the measuring device 30. This method for determining the position of a point of a gob segment therefore makes it possible, by application of the principle of stereovision, to obtain the position of this point along two distinct horizontal measurement axes. The example will be described for the high group of cameras but can be declined for the low group of cameras, "mutadis mutandis". It is understood that those skilled in the art, by applying the principles of stereovision, know how to calculate by triangulation in the plane, relative to any reference frame of the plane, the coordinates of any point seen by the two cameras.

FIG. 9 represents the first high axis of observation 37.1$h$ and the second high axis of observation 37.2$h$, respectively of the first high camera 32.1$h$ and of the second high camera 32.2$h$. Note that we defined above that the axis of observation of the theoretical free fall path 28.24 given by a linear camera 32.1$h$, 32.2$h$, is the axis that passes through the optical center C1$h$, C2$h$ of the lens 33.1$h$, 33.2$h$ of the considered camera, and which intersects this theoretical free fall path 28.24 given at the corresponding point of interception, here the high point of interception 40.1$h$. If the point of intersection of the two optical axes of these two cameras is the high point of interception 40.1$h$, the axis of observation for a camera is coincident with its optical axis. These two axes of observation 37.1$h$, 37.2$h$ are not parallel, but they are concurrent at the high point of interception 40.1$h$, and they are therefore coplanar, in a plane of observation which is preferably horizontal. By definition, the high point of interception belongs to this high horizontal plane of observation defined by the two axes of observation. The high point of interception 40.1$h$ belonging to the considered theoretical free fall path 28.24 is known, either because it is coincident with the point of intersection of the two optical axes of two considered cameras, and/or for example by a prior calibration operation.

FIG. 9 illustrates a first observation beam 39.M1$h$ passing through a point M whose position in the plane of observation is to be determined. The point M is a point belonging to the segment Pi of the gob P which, at the instant of acquisition of the two high and low linear images, is at the height of the high point of interception. The point M can be for example the midpoint between two edge points of the segment Pi of the gob as seen in the acquired linear image of this segment by the first high camera. In the example, the point M is offset by a distance D, in the plane of observation defined by the two axes of observation, from the high point of interception 40.1$h$.

FIG. 9 illustrates a second observation beam 39.M2$h$ passing through the same point M whose position in the plane of observation is to be determined. The second observation beam 39.M2$h$ passes through the optical center C2$h$ of the lens of the second camera, here the second high camera 32.2$h$, and passes through the point M. The point M can for example be the midpoint between two edge points of a segment of a gob as seen in the acquired linear image of this segment by the second camera. In the example of midpoints, we make the simplifying assumption that the midpoint between two edge points of a segment of a gob, as seen from two different angles, is the same. The point M can in this case be considered as being the center of the section of the gob segment Pi.

For each of the two linear cameras 32.1$h$, 32.2$h$, we computationally determine in the linear image of the segment acquired by this camera, an image deviation between the image of the point M and a reference point in the linear image. In the example, this reference point is, for each camera, the image point of the axis of observation of this camera, but we could also take another reference point such as for example the image point of the optical axis. The combination of the reference point in the linear image acquired by the first camera and of the reference point in the linear image acquired by the second camera corresponds, in the example, to the point of intersection of the axes of observation. The location of the reference point in the plane of observation is obtained by calculating the intersection of the observation beams passing through this point.

The image deviation is therefore initially determined, for each camera, in number of pixels. In a known manner, we can deduce from this image deviation an actual deviation of the point M relative to the antecedent of the reference point in the considered linear image, namely in the example an actual deviation between the point M and the axis of observation of the considered camera. This actual deviation is measured, for the first camera, along a first measurement axis, and, for the second camera, along a second measurement axis. The two measurement axes are respectively linked to the axis of observation of the considered camera, here by being perpendicular to the axis of observation of the considered camera. By knowing the layout and the characteristics of the measuring device (for example the position of the optical centers of the cameras in the plane of observation, the orientation of the optical axes, the position of the sensors or the focal length), we know how to derive the relation which links the image deviation and the actual deviation. In the example, we therefore obtain an actual deviation "ra" between the point M and the axis of observation of the first camera, along a measurement axis X1 perpendicular to the first axis of observation, and an actual deviation "rb" between the point M and the axis of observation of the second camera along a measurement axis X2 perpendicular to the second axis of observation. As the two measurement axes X1 and X2 are not parallel, the actual deviations "ra" and "rb" define the position of the point M in the plane of observation relative to the point of interception, here the first high point of interception. As, moreover, the plane of observation can be known by calibration, we can thus know the position of the point M in the 3-dimensional space.

From these two actual deviations, we can define the projection coordinates (dx, dy) of the point M on a reference of orthogonal axes X and Y of the plane of observation (thus horizontal in the example) which intersect at the antecedent of the reference point in the linear image, namely in the example the high point of interception 40.1$h$. The axis Y of this orthogonal reference frame forms an angle "a" with the axis of observation 31.1$h$ of the first linear camera 32.1$h$ and an angle "b" with the axis of observation 37.2$h$ of the second linear camera 32.2$h$.

The projection coordinates (dx, dy) of the point M on the reference frame of orthogonal axes X and Y are given by the formulas:

$$dx=(ra^*\sin(b)-rb^*\sin(a))/(\cos(a)^*\sin(b)-\cos(b)^*\sin(a))$$

$$dy=(ra^*\cos(b)-rb^*\cos(a))/(\cos(a)^*\sin(b)-\cos(b)^*\sin(a))$$

We have thus demonstrated that we can computationally determine the position of at least one representative point of any segment Pi of the gob for which we have two high linear images acquired along non-parallel high axes of observation 37.1$h$, 37.2$h$. This computer determination can be repeated in a similar manner, for the same segment Pi, for which we have two low linear images acquired along non-parallel axes of observation 37.1$b$, 37.2$b$.

In this way, we can determine, for a given but arbitrary segment Pi of the gob P, an amount of horizontal translation of the segment, along a horizontal measurement axis, between the high and low points of interception, by simple difference between the positions of at least one representative point of the given segment Pi of the gob for which we have two high linear images acquired along non-parallel high axes of observation 37.1$h$, 37.2$h$ and two low linear images acquired along non-parallel low axes of observation 37.1$b$, 37.2$b$. Such amount of horizontal translation of the segment can be determined along two distinct horizontal measurement axes. We therefore obtain, for a given but arbitrary segment Pi of the gob P, the set of first and second amounts of horizontal translation of the segment, respectively along a first horizontal measurement axis and along a second horizontal measurement axis, distinct from each other, between the high and low points of interception.

In the method described above, we determined, for any segment, the position of a point of the segment in two horizontal dimensions, based on a first and a second linear image of the same high or low group of cameras. Then, we indicated that we could repeat the same operation based on two low linear images acquired by the other high or low group of cameras, which makes it possible to obtain for the same segment, the position of the reference point of the segment in two horizontal dimensions at the level of this other group of cameras. We deduced therefrom first and second amounts of displacement.

Note that we can achieve the same result by first determining in the first high series and in the first low series acquired respectively by a first set of cameras comprising a high camera and a low camera, of a first high linear image and a first low linear image corresponding to a given segment of the gob to determine a first amount of horizontal translation, along this first horizontal measurement axis, of this given segment, between the high linear image and the low linear image, therefore between the first high and low points of interception. We can then achieve the same operation by determining, in the second high series and in the second low series acquired respectively by the second set of cameras comprising a high camera and a low camera, a second high linear image and a second low linear image corresponding to the same given segment of the gob to determine a second amount of horizontal translation, along a second horizontal measurement axis, of this given segment, between the high linear image and the low linear image, therefore between the first high and low points of interception.

These operations can be carried out for any two segments of the gob, and even for a collection of several segments of a given gob, such a collection possibly including more than two segments of a given gob, therefore possibly including at least three distinct segments of a given gob.

Of course, it is then easy to deduce the set of first and second average speeds of horizontal translation of the segment, respectively along a first horizontal measurement axis and along a second horizontal measurement axis, distinct from each other, between the high and low points of interception. For this, it suffices to divide the first and second amounts of horizontal translation of the segment by the time elapsed between the acquisitions of the high and low linear images of the segment, used to determine the amounts.

Since we can know, for any segment, the set of first and second amounts of horizontal translation of the segment, respectively along a first horizontal measurement axis and along a second horizontal measurement axis, distinct from each other, between the high and low points of interception, we can deduce therefrom the set of first and second amounts of rotation of the gob, respectively around a first horizontal axis and around a second horizontal axis, distinct from each other, between the high and low points of interception.

A first method in this sense requires making the assumption that the deformation of the gob during the free fall is negligible. In this case, it suffices to choose two distinct segments of the gob, preferably distant from each other along the length of the gob. We can then determine a gob directrix straight line as being a straight line passing through a first representative point belonging to a first segment of the gob and through a second representative point belonging to a second segment of the gob. We can determine a first orientation of this gob directrix straight line based on the positions, successive to their passage in the high plane of observation, of these two representative points of the two segments for which we have, for each, two high linear images acquired along non-parallel high axes of observation 37.1$h$, 37.2$h$. We can also determine a second orientation of this gob directrix straight line based on the position of these two representative points of the two segments for which we have, for each, two low linear images acquired along non-parallel low axes of observation 37.1$b$, 37.2$b$. By comparing the two orientations of this gob directrix straight line, we can deduce the amounts of rotation of the gob, respectively around a first horizontal axis and around a second horizontal axis, distinct from each other, between the high and low points of interception.

More generally, in order to determine first and second amounts of rotation of the gob around two distinct horizontal axes, we can also determine a gob directrix straight line as being a straight line defined in the form of a linear regression of a representative point of several segments Pi of the gob. We then use more than two segments. We can use all the segments of the gob for which we have two high linear images and two low images acquired respectively along non-parallel high axes of observation 37.1$h$, 37.2$h$ and along non-parallel low axes of observation 37.1$b$, 37.2$b$. We can also choose to use a collection of segments, comprising more than two segments but less than all the segments. We can thus determine the orientation of such a gob directrix straight line for the passage of the gob at the high point of interception. For this, we use the positions of the representative points of said several segments from two high linear images acquired, for these segments, along non-parallel high axes of observation 37.1$h$, 37.2$h$. We can also determine the orientation of such a gob directrix straight line for the passage of the gob at the low point of interception, by using the positions of the representative points of said several segments from two low linear images acquired, for these segments, along non-parallel low axes of observation 37.1$b$, 37.2$b$. By comparing the two orientations of this gob directrix straight line, we can deduce the amounts of rotation of the gob, respectively around a first horizontal axis and around a second horizontal axis, distinct from each other, between the high and low points of interception.

Regardless of the method implemented to determine the amounts of rotation of the gob, we can deduce the set of first and second average speeds of rotation of the gob, respectively around a first horizontal axis and around a second horizontal axis, distinct from each other, between the high and low points of interception. For this, we divide the first and second amounts of rotation of the gob by the time elapsed between the acquisitions of the high and low linear images of the segments, used to determine the amounts.

By considering the gobs as non-deformable, we can, in the same way as for the rotations, determine the amount of overall horizontal translation of the gob along two distinct directions. For example, by determining the amount of horizontal translation for each of at least 2 segments then, if all the segments have the same amounts of horizontal translation, the rotation of the gob is zero and we determine an amount of overall translation of the gob. We can therefore determine the kinematics of a non-deformable gob by calculating the average speeds of horizontal translations along 2 distinct directions, as well as the rotations around 2 horizontal axes.

However, the gob can also deform during the free fall. We can therefore consider the amounts of horizontal translation of at least three distinct segments of the gob. If the amounts of horizontal translation are identical for the three segments, there is a pure overall translation of the gob. Otherwise, we can calculate, by considering a whole collection of segments 2 by 2, a rotation of a gob portion comprised between the two segments. If at least 2 of these rotations are different, then we deduce therefrom a deformation. And if we divide the amounts of horizontal translation by the travel time, we obtain average speeds of horizontal deformation expressed as the amounts of horizontal translation of several segments. In other words, we can assign to each segment (at least three segments) a two-dimensional average speed of horizontal translation between the high and low planes of observation. By determining this two-dimensional average speed of horizontal translation between the high and low planes of observation for a set of distinct segments of the same gob, we obtain a speed field. The analysis of this field of two-dimensional average speeds of horizontal translation makes it possible to determine the kinematics (translation and rotation) of the gob between the high and low points of interception, with the exception of the vertical axis of rotation, but also makes it possible to observe and determine a deformation amount and a deformation speed during the free fall.

With the elements determined above, we can determine a path of at least one or more segments of the gob according to the three dimensions of space. This path can be determined not only between the high point of interception and the low point of interception, but also beyond the low point of interception in the considered free fall area. Indeed, it was seen that we are able to determine, at the low point of interception, the position of at least one representative point of each segment according to the three dimensions of space. We can consider that, in the free fall area, the only force applied to the free falling gob is gravity which acts vertically. Therefore any speed of horizontal translation initially caused, for example, by the scissor cut, is maintained until it enters the distributor 20. We can therefore predict by extrapolation the shape, the position (centering and inclination) of the gobs when they enter the distributor 20.

Moreover, based on the elements above, it will be possible to perform the measurement of one or more geometric dimensions of the gob.

We can thus measure a first diameter of the gob along a first horizontal direction and/or a second diameter along a second horizontal direction distinct from the first horizontal direction. This can be achieved very simply by noting, in a linear image of one of the series of linear images, the image deviation between in the images of two edge points of the segment, these two edge points therefore corresponding to the two edges of the segment of the gob as seen in the linear image, therefore to two diametrically opposite points of the outer side wall of the gob when it is cylindrical or substantially cylindrical. As seen above, we can deduce from this image deviation an actual deviation between the two edge points of the segment. This actual deviation is measured, for the first camera, along a first horizontal measurement axis and, for the second camera, along a second horizontal measurement axis distinct from the first one. The two measurement axes are respectively linked to the axis of observation of the considered camera, by being here perpendicular to the axis of observation of the considered camera. By knowing the layout and the characteristics of the measuring device (for example position of the cameras, orientation of the axes of observation, distance of the cameras at the corresponding point of interception, focal length of the lenses of the cameras, etc.), we know how to derive the relation that links the image deviation and the actual deviation.

We can still measure a volume of the gob, this volume can be calculated as being the sum of the individual volumes of each imaged gob segment. This volume will be an estimate necessarily including an error, depending in particular on whether the gob is perfectly cylindrical or not.

If each horizontal section of the gob is cylindrical of revolution, this volume can be calculated as being the sum of the individual volumes of each imaged camera segment. For this, we can assign to each segment Pi an individual volume Vi determined as a function of the diameter Di of the segment (which can be determined in the manner indicated above), and of the positional deviation hi between the considered segment of the gob and the one whose image is contained in the previous image of a given series of linear images, as previously defined. The elementary volume can therefore be written:

$$Vi = hi * PI * Di \text{ (PI being the number } PI\text{)}$$

Thanks to the invention, we will be able to implement a method for controlling a glass article molding installation with an installation including a source of glass, at least one shear 22 which is arranged at the outlet of the source of glass 18 and which is actuated at regular intervals to cut successive gobs which fall by gravity into a distributor 20 which leads the gobs along at least one gob load path towards a forming cavity 16 of the installation, and the gob load path comprising at least one area of free fall of the gob between the shear 22 and the distributor 20.

This method for controlling an installation will comprise a measurement of the kinematic characteristics of the free fall of the glass gobs in the area of free fall of the gob between the shear 22 and the distributor. This measurement will comprise, as described above, the determination, for a collection of several segments of a given gob, of amounts of horizontal translation of each section of the collection. The control method will advantageously include an adjustment of at least one operating parameter of the shear 22 as a function of at least the amounts of horizontal translation of each section of the collection.

The adjustment can comprise the adjustment of the position of a cutting point of the shear 22. The cutting point of the shear can be defined as the point where the two blades of the shear fully close.

The adjustment can comprise the adjustment of a speed of displacement of at least one blade of the shear 22, or the adjustment of the speed of displacement of two blades of the shear 22.

The adjustment can comprise the adjustment of a profile of speed of displacement of at least one blade of the shear 22. Thus, one of the two blades, or both, can have a speed of displacement that is not uniform during a gob cutting operation between an open configuration of the shear and a closed configuration of the shear. During a displacement of at least one blade of the shear 22 between an open configuration of the shear and a closed configuration of the shear, the speed of a blade can for example have a first phase slower or faster than a second phase, to an extent that can be adjustable depending on one or more kinematic characteristics of the free fall of the glass gobs in the free fall area.

The adjustment can comprise the adjustment of a lubrication parameter of the shear 22.

In this control method, the measurement of the kinematic characteristics of the free fall of the glass gobs in the free fall area can comprise, as in the measuring method described above, the determination of at least two horizontal components of speed of horizontal translation of at least one segment of the gob between the high and low points of interception.

In this control method, the measurement of the kinematic characteristics of the free fall of the glass gobs in the free fall area can comprise, as in the measuring method described above, the determination of at least a first component of rotation of the gob around a first horizontal axis. In this case, the adjustment can comprise the adjustment of a component of the position of a cutting point of the shear, and/or the adjustment of a component of the speed of displacement of at least the blade of the shear, and/or the adjustment of a profile of a component of speed of displacement of at least one blade of the shear along a direction perpendicular to the first horizontal axis. In such a control method, said measurement can further comprise the determination of at least a second component of rotation of the gob around a second horizontal axis distinct from the first horizontal axis, and can then further include an adjustment of at least one operating parameter of the shear as a function of the first component of rotation of the gob around the first horizontal axis and of the second component of rotation of the gob around the second horizontal axis.

More generally, a method for controlling an installation can comprise a measurement of the kinematic characteristics of the free fall of the glass gobs in the area of free fall of the gob between the shear and the distributor having one or several of the characteristics of the measuring method described above.

In such a method for controlling an installation, we can thus drive any operating parameter of the installation by taking into account a measurement of the kinematic characteristics of the free fall of the gobs, in particular one or more operating parameters among the movement and/or position parameters of one or more plungers 17 and/or of the cylinder 19 of the glass source 18. Such a control method aims to improve the conformity of the gobs and their entry in the distributor 20.

As with any method sensor, it is obvious that the role of the measurements is to monitor the method and therefore to adjust the method to obtain the expected results in terms of quality and productivity. The measurements can be displayed for an operator who adjusts the installation, in particular the gob distributor 20, or be provided by computer link to a method calculator, which automatically corrects the instructions of the members of the glass source 18 and/or distributor 20, thus allowing the servo-control of the method.

The time monitoring of these measurements also makes it possible to anticipate and correct the drifts of the method.

By learning, it is possible to easily associate the measurements of the device according to the invention with the conformity results of the manufactured articles. We can then statistically determine values of these measurements of the gobs which guarantee containers of good quality. This information can then be easily used to create servo-controls of the glass source 18 and/or distributor 20 directly from the measurements of the gobs directly under the shear 22, upstream of the distributor 20, or at the outlet of the distributor 20.

We mentioned above the possibility of having at least two devices for measuring the kinematic characteristics of the free fall of a glass gob, one installed for the high free fall area 24 and the other for the low of free fall area 26 of the same gob load path between a given glass source and a given forming cavity. Thus, we are able to obtain the kinematic characteristics of the free fall of a gob in two locations of its path. By combining these characteristics, we can determine information concerning the speed loss or gain of the gob, concerning the deformation of the gob, concerning the elongation of the gob in the distributor 20. We can also improve the operation of loading the gobs in the mold by determining the kinematics of the free fall at the inlet of the mold and by monitoring it by the known ordinary settings of the distributor (accelerator, position of the guide sections, lubrication, cooling).

In general, the acquisition period Ta, and therefore the acquisition frequency Fa, of the linear cameras are preferably considered fixed and known. If they vary, they are considered known at any time by the calculation unit. The acquisition period is the period between the beginning of integration for two acquisitions of two successive images. The integration time is generally less than the acquisition period Ta. The linear cameras can be of any known type, including cameras called Tdi (Time Delay and Integration)

cameras. The acquisitions by the cameras take place during the free fail of the gobs. This condition is fulfilled when the fields 34 of all the cameras are at a distance from the shear 22 which is greater than the length of the gobs. The driving of the cameras can use a signal indicating the instant of cutting of the shear 22, for example the instant of ordering the closing, or the instant of complete closing of the shear 22, and determine a time window during which it is expected that a gob will be observed.

The invention claimed is:

1. A measurement method for measuring kinematic characteristics of a free fall of a glass gob in a glass article molding installation, in an area of free fall of the gob along a gob load path between a glass source and a forming cavity, the gob having a theoretical vertical free fall path along a direction in the free fall area and the gob having a start end and a tail end and a gob length between the start end and the tail end, the measurement method comprising:

acquiring, using four distinct linear cameras each linear camera having a linear photoelectric sensor, a lens with an optical center and an optical axis, defining for said linear camera an observed linear field, at least four series of successive digital linear images, each linear image of a given series of linear images being the linear image of the observed linear field of the corresponding linear camera, the four series comprising a first high series acquired by a first high camera, a first low series acquired by a first low camera, a second high series acquired by a second high camera, and a second low series acquired by a second low camera, the four series of linear images corresponding to linear images respectively of a first high linear field, of a first low linear field, of a second high linear field and of a second low linear field such that:

the first high linear field and the first low linear field each extend along a respective plane defined by the corresponding optical axis and a horizontal extension direction perpendicular to the corresponding optical axis, the first high linear field and the first low linear field each intercepting the theoretical free fall path, respectively at a first high point of interception and at a first low point of interception, the first high and low points of interception being offset from each other according to the theoretical free fall path by a vertical offset;

the second high linear field and the second low linear field each extend along a respective plane defined by the corresponding optical axis and a horizontal extension direction perpendicular to the corresponding optical axis, the second high linear field and the second low linear field each intercepting the theoretical free fall path, respectively at a second high point of interception and at a second low point of interception, the second high and low points of interception being offset from each other along the direction of the theoretical free fall path;

the linear images of the four series of linear images each comprising an image of the corresponding point of interception, acquired respectively along a first high axis of observation, a first low axis of observation, a second high axis of observation and a second low axis of observation, the axis of observation of each point of interception by the corresponding linear camera being contained in the linear field of the corresponding linear camera, passing through the optical center of the lens of the camera, and through the corresponding point of interception of the theoretical free fall path;

the first and second high axes of observation form together, in projection on a plane perpendicular to the direction of the theoretical free fall path, a high deviation angle of observation different from 0 angle degree and different from 180 angle degrees around the theoretical free fall path;

the first and second low axes of observation form together, in projection on a plane perpendicular to the direction of the theoretical free fall path, a low deviation angle of observation different from 0 angle degree and different from 180 angle degrees around the theoretical free fall path;

a time interval between the acquisition of any two images of the same series and between any two images of two distinct series is determinable;

the measurement method including a computer identification of a high linear image and a low linear image each comprising an image of a same given end of the gob among the start end and the tail end of the gob and a computer deduction of a time interval between the acquisition of the high linear image and the acquisition of the low linear image and, from said identification:

a computer calculation of an instantaneous speed of vertical translation of said given end of the gob upon passage of the given end of said gob at one among the high and low points of interception, from the time interval between the acquisition of the high linear image and the acquisition of the low linear image, and by application of a law of kinematics of free falling bodies;

and computationally, a matching, for intermediate linear images comprising an image of a segment of the gob other than the start and tail ends, of the image of the gob contained in the intermediate linear image with a corresponding segment of the gob, by application of the law of kinematics of the free falling bodies as a function of said instantaneous speed of vertical translation of the given end of said gob upon passage of the given end of the gob at the point of interception corresponding to said instantaneous speed of vertical translation of the given end of said gob, and of time elapsed between the acquisition of said considered intermediate linear image and said passage of said end of the gob at the point of interception corresponding to said instantaneous speed of vertical translation of the given end of said gob;

and the measurement method including a computer determination of at least one among:

for at least two distinct segments of the gob, a set of first and second amounts of horizontal translation of the segment, or a set of first and second average speeds of horizontal translation of the segment, respectively along a first horizontal measurement axis and along a second horizontal measurement axis, distinct from each other, between the high and low points of interception, a set of first and second amounts of rotation of the gob, or a set of first and second average speeds of rotation of the gob, respectively around a first horizontal axis and around a second horizontal axis, distinct from each other, between the high and low points of interception, an amount of deformation of the gob, or an average speed of deformation of the gob, between the high and low points of interception, and a path of at least one or more segments of the gob according to three dimensions of space.

2. The measurement method according to claim 1, wherein the measurement method comprises a computer determination of a positional deviation between two considered segments of the gob whose respective images are contained in two consecutive linear images of a given series of linear images, as a function of:

a number of linear images in the series determined between, on the one hand, one of the consecutive linear images comprising one of the two considered segments and, on the other hand, one among a start linear image and a tail linear image of the determined series, comprising respectively an image of the start end and the tail end of the gob;

the instantaneous speed of vertical translation of a given end of the gob upon passage of the given end of said gob at the point of interception corresponding to the determined series;

a frequency of acquisition of the linear images for the determined series; and a gravitational constant.

3. The measurement method according to claim 1, wherein the measurement method comprises a computer calculation of first and second instantaneous speeds of vertical translation of said given end of the gob during passage of the given end of said gob at one among the high and low points of interception, respectively based on the first high series and the first low series of linear images, and based on the second high series and the second low series of linear images, and wherein the measurement method comprises computationally determining an instantaneous speed of vertical translation of said given end of the gob during passage of the given end of said gob at this point of interception as the average of said first and second instantaneous speeds of vertical translation of said given end of the gob during passage of the given end of said gob at this point of interception.

4. The measurement method according to claim 1, wherein the measurement method comprises a computer calculation of the gob height between the start end and the tail end by summing the positional deviations for all the successive linear images of a determined series ranging from the start linear image to the tail linear image of the determined series.

5. The measurement method according to claim 1, wherein the measurement method comprises a computer determination, for a collection of several segments of a given gob:

in the first high series and in the first low series of a first high linear image and of a first low linear image corresponding to each segment to determine the first amount of horizontal translation, along the first horizontal measurement axis, of each segment of the collection between the high linear image and the low linear image between the first high and low points of interception;

in the second high series and in the second low series of a second high linear image and of a second low linear image corresponding to each segment to determine the second amount of horizontal translation, along the second horizontal measurement axis, of each segment between the first high and low points of interception;

and the method comprises the step of computationally deducing amounts of horizontal translation of each section of the collection:

two horizontal components of average speed of horizontal translation of the gob between the high and low points of interception, respectively along two distinct horizontal axes; and/or two angles of rotation of the gob between the high and low points of interception around two horizontal axes; and/or a deformation of the gob during said gob's fall between the high and low points of interception.

6. The measurement method according to claim 1, wherein the measurement method comprises a computer measurement of at least one geometric dimension of the gob among:

a first diameter of the gob along a first horizontal direction, a second diameter along a second horizontal direction distinct from the first horizontal direction, a length or a height of the gob, a volume of the gob.

7. The measurement method according to claim 1, wherein the computer determination of an amount of horizontal translation of a segment between a high point of interception and the corresponding low point of interception, comprises the detection of the position of at least the same point of the segment in the high linear image and in the low linear image of the corresponding high series and low series.

8. The measurement method according to claim 7, wherein the same point is one among an edge point of the segment, a midpoint between two edge points of the segment, or a point whose image is recognizable in the high and low linear images.

9. The measurement method according to claim 1, wherein the first high axis of observation and the first low axis of observation are superimposed along the vertical direction in the same vertical plane.

10. The measurement method according to claim 1, wherein the first high axis of observation and the first low axis of observation are parallel to each other.

11. The measurement method according to claim 1, wherein the first high axis of observation and the first low axis of observation are perpendicular to the theoretical free fall path.

12. The measurement method according to claim 1, wherein the first high axis of observation and the second high axis of observation intercept the same high point of interception of the theoretical vertical free fall path, and/or the first low axis of observation and the second low axis of observation intercept the same low point of interception of the theoretical vertical free fall path.

13. A measurement device for measuring kinematic characteristics of the free fall of a glass gob in an glass article molding installation, in an area of free fall of the gob along a gob load path between a glass source and a forming cavity, the gob having a theoretical vertical free fall path along a direction in the free fall area and the gob having a start end and a tail end and a gob length between the start end and the tail end, the measurement device comprising:

at least four distinct linear cameras, each linear camera having a linear photoelectric sensor, a lens with an optical center and an optical axis defining for said linear camera an observed linear field, comprising a first high camera, a first low camera, a second high camera and a second low camera, the linear cameras having respectively a first high optical axis, a first low optical axis, a second high optical axis and a second low optical axis, distinct from each other, said cameras each being able to form digital images of an observed linear field, respectively first high linear field, first low linear field, second high linear field and second low linear field, the linear cameras being configured to acquire at least four series of successive digital linear images, each linear image of a given series of linear images being the linear image of the observed linear field of the corresponding linear camera, the four series comprising a first high series acquired by the first high camera, a first low series acquired by the first low camera, a second high series acquired by the second high camera, and a second low series acquired by the second low camera, the four series of linear images corresponding to linear images respectively of the first high linear field, of the first low linear field, of the second high linear field and of the second low linear field, wherein:
- the first high linear field and the first low linear field each extend along a respective plane defined by the corresponding optical axis and a horizontal extension direction perpendicular to the corresponding optical axis, the first high linear field and the first low linear field each intercepting the theoretical free fall path, respectively at a first high point of interception and at a first low point of interception, the first high and low points of interception being offset from each other according to the theoretical free fall path;
- the second high linear field and the second low linear field each extend along a respective plane defined by a corresponding optical axis and a horizontal extension direction perpendicular to the corresponding optical axis, the second high linear field and the second low linear field each intercepting the theoretical free fall path, respectively at a second high point of interception and at a second low point of interception, the second high and low points of interception being offset from each other along the direction of the theoretical free fall path;
- the high optical axes are distinct from each other in perpendicular projection on a plane perpendicular to the direction of the theoretical free fall path, and the low optical axes are distinct from each other in perpendicular projection on a plane perpendicular to the direction of the theoretical free fall path;
- the high optical axes form together, in projection on a plane perpendicular to the direction of the theoretical free fall path, a deviation angle of high optical axis different from 0 angle degree and different from 180 angle degrees around an axis parallel to the theoretical free fall path passing through the point of convergence of the projections of the two optical axes in the projection plane;
- the low optical axes form together, in projection on a plane perpendicular to the direction of the theoretical free fall path, an acute deviation angle of low optical axis different from 0 angle degree and different from 180 angle degrees around an axis parallel to the theoretical free fall path passing through the point of convergence of the projections of the two optical axes in the projection plane, and wherein the measurement device includes an electronic calculation unit and is configured to measure kinematic characteristics of the free fall of the gob, the measurement device is further configured to:

acquire, using the four distinct linear cameras at least four series of successive linear digital images, each image of a given series of linear images being the linear image of the observed linear field of the corresponding linear camera, the four series comprising a first high series acquired by the first high camera, a first low series acquired by the first low camera, a second high series acquired by the second high camera, and a second low series acquired by the second low camera, the four series of linear images corresponding to linear images respectively of a first high linear field, of a first low linear field, of a second high linear field and of a second low linear field such that:
- the images of the four series of linear images each comprising an image of the corresponding point of interception, acquired respectively along a first high axis of observation, a first low axis of observation, a second high axis of observation and a second low axis of observation, the axis of observation of each point of interception by the corresponding linear camera being contained in the linear field of the corresponding linear camera, passing through the optical center of the lens of the camera, and through the corresponding point of interception of the theoretical free fall path;
- a time interval between the acquisition of any two images of the same series and between any two images of two distinct series being determinable;

the measurement device further configured to determine a computer identification, by the electronic calculation unit, of a high linear image and a low linear image each comprising an image of a same given end of the gob among the start end and the tail end of the gob and a computer deduction, by the electronic calculation unit, of a time interval between the acquisition of the high linear image and the acquisition of the low linear image and, from said identification;

a computer calculation, by the electronic calculation unit, of an instantaneous speed of vertical translation of said given end of the gob upon passage of the given end of said gob at one among the high and low points of interception, from the time interval between the acquisition of the high linear image and the acquisition of the low linear image, and by application of law of kinematics of free falling bodies;

and computationally, a matching by the electronic calculation unit, for the intermediate linear images comprising an image of a segment of the gob other than the start and tail ends, of the image of the gob contained in the intermediate linear image with a corresponding segment of the gob, by application of the law of kinematics of the free falling bodies as a function of said instantaneous speed of vertical translation of the given end of said gob upon passage of the given end of the gob at the point of interception corresponding to said instantaneous speed of vertical translation of the given end of said gob, and of time elapsed between the acquisition of said considered intermediate linear image and said passage of said end of the gob at the point of interception corresponding to said instantaneous speed of vertical translation of the given end of said gob;

and a computer determination, by the electronic calculation unit, of at least one among:
- for at least two distinct segments of the gob, a set of first and second amounts of horizontal translation of the segment, or a set of first and second average speeds of horizontal translation of the segment, respectively along a first horizontal measurement axis and along a second horizontal measurement axis, distinct from each other, between the high and low points of interception, a set of first and second amounts of rotation of the gob, or the set of first and second average speeds of rotation of the gob, respectively around a first horizontal axis and around a second horizontal axis, distinct from each other, between the high and low points of interception, an amount of deformation of the gob, or an average speed of deformation of the gob, between the high and low points of interception, and a path of at least one or more segments of the gob according to the three dimensions of space.

14. The measurement device according to claim 13, wherein the first high linear field and the first low linear field as well as the second high linear field and the second low linear field each intercept the theoretical free fall paths of several glass gobs formed at the same time by the same source of glass.

15. A control method for controlling a glass article molding installation, the installation including a source of glass, at least one shear which is arranged at the output of the glass source and which is actuated at regular intervals to cut successive gobs which fall by gravity into a distributor that leads the gobs along at least one gob load path towards a forming cavity of the installation, and the gob load path comprising at least one area of free fall of the gob between the shear and the distributor, wherein the control method includes a measurement of the kinematic characteristics of the free fall of the glass gobs in the area of free fall of the gob between the shear and the distributor, said measurement comprising the determination, for a collection of several segments of a given gob, of amounts of horizontal translation of each section of the collection, and wherein the control method includes an adjustment of at least one operating parameter of the shear as a function of at least the amounts of horizontal translation of each section of the collection, and wherein said measurement of the kinematic characteristics of the free fall of the glass gobs is implemented according to a measurement method for measuring kinematic characteristics of a free fall of a glass gob in a glass article molding installation, in an area of free fall of the gob along a gob load path between a glass source and a forming cavity, the gob having a theoretical vertical free fall path along a direction in the free fall area and the gob having a start end and a tail end and a gob length between the start end and the tail end, the measurement method comprising:

acquiring, using four distinct linear cameras each linear camera having a linear photoelectric sensor, a lens with an optical center and an optical axis defining for said linear camera an observed linear field, at least four series of successive digital linear 1 images, each linear image of a given series of linear images being the linear image of the observed linear field of the corresponding linear camera, the four series comprising a first high series acquired by a first high camera, a first low series acquired by a first low camera, a second high series acquired by a second high camera, and a second low series acquired by a second low camera, the four series of linear images corresponding to linear images respectively of a first high linear field, of a first low linear field, of a second high linear field and of a second low linear field such that:

the first high linear field and the first low linear field each extend along a respective plane defined by the corresponding optical axis and a horizontal extension direction perpendicular to the corresponding optical axis, the first high linear field and the first low linear field each intercepting the theoretical free fall path, respectively at a first high point of interception and at a first low point of interception, the first high and low points of interception being offset from each other according to the theoretical free fall path by a vertical offset;

the second high linear field and the second low linear field each extend along a respective plane defined by the corresponding optical axis and a horizontal extension direction perpendicular to the corresponding optical axis, the second high linear field and the second low linear field each intercepting the theoretical free fall path, respectively at a second high point of interception and at a second low point of interception, the second high and low points of interception being offset from each other along the direction of the theoretical free fall path;

the linear images of the four series of linear images each comprising an image of the corresponding point of interception, acquired respectively along a first high axis of observation, a first low axis of observation, a second high axis of observation and a second low axis of observation, the axis of observation of each point of interception by the corresponding linear camera being contained in the linear field of the corresponding linear camera, passing through the optical center of the lens of the camera, and through the corresponding point of interception of the theoretical free fall path;

the first and second high axes of observation form together, in projection on a plane perpendicular to the direction of the theoretical free fall path, a high deviation angle of observation different from 0 angle degree and different from 180 angle degrees around the theoretical free fall path;

the first and second low axes of observation form together, in projection on a plane perpendicular to the direction of the theoretical free fall path, a low deviation angle of observation different from 0 angle degree and different from 180 angle degrees around the theoretical free fall path;

a time interval between the acquisition of any two images of the same series and between any two images of two distinct series is determinable;

the measurement method including a computer identification of a high linear image and a low linear image each comprising an image of a same given end of the gob among the start end and the tail end of the gob and a computer deduction of a time interval between the acquisition of the high linear image and the acquisition of the low linear image and, from said identification:

a computer calculation of an instantaneous speed of vertical translation of said given end of the gob upon passage of the given end of said gob at one among the high and low points of interception, from the time interval between the acquisition of the high linear image and the acquisition of the low linear image, and by application of a law of kinematics of free falling bodies;

and computationally, a matching, for intermediate linear images comprising an image of a segment of the gob other than the start and tail ends, of the image of the gob contained in the intermediate linear image with a corresponding segment of the gob, by application of the law of kinematics of the free falling bodies as a function of said instantaneous speed of vertical translation of the given end of said gob upon passage of the given end of the gob at the point of interception corresponding to said instantaneous speed of vertical translation of the given end of said gob, and of time elapsed between the acquisition of said considered intermediate linear image and said passage of said end of the gob at the point of interception corresponding to said instantaneous speed of vertical translation of the given end of said gob; and the measurement method including a computer determination of at least one among:

for at least two distinct segments of the gob, a set of first and second amounts of horizontal translation of the segment, or a set of first and second average speeds of horizontal translation of the segment, respectively along a first horizontal measurement axis and along a second horizontal measurement axis, distinct from each other, between the high and low points of interception, a set of first and second amounts of rotation of the gob, or a set of first and second average speeds of rotation of the gob, respectively around a first horizontal axis and around a second horizontal axis, distinct from each other, between the high and low points of interception, an amount of deformation of the gob, or an average speed of deformation of the gob, between the high and low points of interception, and a path of at least one or more segments of the gob according to three dimensions of space.

16. A control method according to claim 15, wherein the adjustment comprises the adjustment of the position of a cutting point of the shear.

17. The control method according to claim 15, wherein the adjustment comprises the adjustment of a speed of displacement of at least the blade of the shear.

18. The control method according to claim 15, wherein the adjustment comprises the adjustment of a profile of speed of displacement of at least one blade of the shear.

19. The control method according to claim 15, wherein the adjustment comprises the adjustment of a lubrication parameter of the shear.

20. The control method according to claim 15, wherein said measurement comprises the determination of at least two horizontal components of speed of horizontal translation of at least one segment of the gob between high and low points of interception.

21. The control method according to claim 15, wherein said measurement comprises the determination of at least a first component of rotation of the gob around a first horizontal axis, and wherein the adjustment comprises the adjustment of a component of the position of a cutting point of the shear, and/or the adjustment of a component of the speed of displacement of at least the blade of the shear, and/or the adjustment of a profile of a component of speed of displacement of at least one blade of the shear.

22. The control method according to claim 15, wherein said measurement comprises the determination of at least a second component of rotation of the gob around a second horizontal axis distinct from the first horizontal axis, and wherein the control method includes an adjustment of at least one operating parameter of the shear as a function of the first component of rotation of the gob around the first horizontal axis and of the second component of rotation of the gob around the second horizontal axis.

* * * * *